US012617900B2

(12) United States Patent
Zhou

(10) Patent No.: US 12,617,900 B2
(45) Date of Patent: May 5, 2026

(54) POLYMERIZATION METHOD FOR SULFATE ESTER (AMINE) TYPE LINKER POLYMER

(71) Applicant: NEIMENGGU TUWEI NEW MATERIALS TECHNOLOGY CO., LTD., Erdos City (CN)

(72) Inventor: Yunbin Zhou, Baiyin City (CN)

(73) Assignee: NEIMENGGU TUWEI NEW MATERIALS TECHNOLOGY CO., LTD., Erdos City (CN)

(*) Notice: Subject to any disclaimer, the term of this patent is extended or adjusted under 35 U.S.C. 154(b) by 902 days.

(21) Appl. No.: 17/048,413

(22) PCT Filed: Apr. 16, 2019

(86) PCT No.: PCT/CN2019/082941
§ 371 (c)(1),
(2) Date: Oct. 16, 2020

(87) PCT Pub. No.: WO2019/201254
PCT Pub. Date: Oct. 24, 2019

(65) Prior Publication Data
US 2021/0115194 A1 Apr. 22, 2021

(30) Foreign Application Priority Data
Apr. 16, 2018 (CN) ......................... 201810339395.6

(51) Int. Cl.
*C08G 75/30* (2006.01)

(52) U.S. Cl.
CPC .................................... *C08G 75/30* (2013.01)

(58) Field of Classification Search
CPC ........... C08G 75/30; C08G 75/23; C08K 7/24
See application file for complete search history.

(56) References Cited

U.S. PATENT DOCUMENTS

| | | | |
|---|---|---|---|
| 3,733,304 A | 5/1973 | Firth et al. | |
| 3,895,045 A | 7/1975 | Firth, Jr. | |
| 2018/0194901 A1* | 7/2018 | Sharpless | C07F 9/5407 |

FOREIGN PATENT DOCUMENTS

| | | |
|---|---|---|
| CN | 104955874 A | 9/2015 |
| JP | 2002173465 A | 6/2002 |

(Continued)

OTHER PUBLICATIONS

Gao et al., "Bifluoride-Catalysed Sulfur (VI) Floride Exchange Reaction for the Synthesis of Polysulfates and Polysulfonates," Nature Chemistry, vol. 9, No. (11), Jun. 19, 2017, 13 pages.

(Continued)

*Primary Examiner* — Shane Fang
(74) *Attorney, Agent, or Firm* — Cooper Legal Group, LLC

(57) ABSTRACT

The present invention relates to a synthesis method for sulfate ester (amine) type linker polymer, which comprises a monomer containing hydroxyl or amino group and sulfuryl fluoride monomer proceeding a polycondensation reaction under a basic condition by one-pot process. As compared to the traditional polyester synthesis method, the present invention is economical; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

7 Claims, 12 Drawing Sheets

(56) References Cited

FOREIGN PATENT DOCUMENTS

| | | | |
|---|---|---|---|
| WO | WO-2014089078 | A1 | 6/2014 |
| WO | WO-2016/209920 | A1 | 12/2016 |

OTHER PUBLICATIONS

Dong et al., "SuFEx-based Synthesis of Polysylfates," Angew. Chem. Int. Ed., vol. 53, 2014, 15 pages.

Zhu et al., "The Recent Progress in the Preparation of BPA Polycarbonates (PC)," Hubei Chemical Industry, 2002, 4 pages.

Hunt et al., "Bisphenol A Exposure Causes Meiotic Aneuploidy in the Female Mouse," Current Biology, vol. 13, Apr. 1, 2003, 8 pages.

Howdeshell et al., "Bisphenol A Is Released from Used Polycarbonate Animal Cages into Water at Room Temperature," Environmental Health Perspectives, vol. 111, No. 9, Jul. 2003, 8 pages.

Jiajia Dong et al, SuFEx-Based Synthesis of Polysulfates, Aug. 5, 2014, vol. 53, No. 36 Angewandte Chemie International Edition,5 pages.

Bing Gao et al, Bifluoride-catalysed sulfur (VI) fluoride exchange reaction for the synthesis of polysulfates and polysulfonates, Jun. 19, 2017, vol. 9, No. 11, Nature Chemistry, 6 pages.

* cited by examiner

POLYMERIZATION METHOD FOR SULFATE ESTER (AMINE) TYPE LINKER POLYMER

TECHNICAL FIELD

The present invention belongs to the field of polymer material technology, and specifically, to sulfate ester (amine) type polymer by the polycondensation reaction of phenols or alcohols or amines and sulfonyl fluorides or sulfuryl fluorides under a basic condition.

BACKGROUND

With the continuous progress of science and technology, as one of the important chemical synthetic materials, polyester industry has made rapid development in recent years. At present, polyester materials have been widely used in the fields of fiber manufacturing, packaging, engineering plastics, electronics and electrical appliances, medical materials, construction, automotive, etc. In comparison, polyester materials have the following advantages: their syntheses are relatively simple and easy to control, the utilization rate of raw material monomers is high, their cost is more cheaper, and so on. Therefore, polyester materials have been widely used in industrial production and people's daily life.

However, even though polyester materials have been widely used in industrial production and people's daily life, and experts and scholars in various countries are also constantly improving technology, polyester materials themselves still have some deficiencies. For example, a common polyester material: poly(bisphenol A) type PC, it has good resistance to impact, electrical performances, etc. (Zhi-gang ZHU, Fuming MEI, Shu WANG, etc. *The Recent Progress in the Preparation of BPA Polycarbonates* (*PC*), *Hubei Chemical Industry,* 2002, 4, 7); but it still has some inherent physical or chemical deficiencies, such as poor tolerance (UV, acid and base, water, etc.), poor abrasion resistance (caused by lower polymerization degree), etc. which limit its wider application. Meanwhile, as the material components may have some chemical reactions with other substances in the process of use, some harmful products on the human body or living environment may be generated, such as, bisphenol A released by bisphenol A type PC in the process of use will cause serious influence on the reproductive system of bodies (Hunt, PA; Kara E. Koehler, Martha Susiarjo, Craig A. Hodges, Arlene Ilagan, Robert C. Voigt, Sally Thomas, Brian F. Thomas and Terry J. Hassold. *Curr. Bio.* 2003, 13, 546; Howdeshell, K L; Peterman P H, Judy B M, Taylor J A, Orazio C E, Ruhlen R L, Vom Saal F S, Welshons W V. *Environ. Health Perspect.* 2003, 111, 1180).

In addition, the developments of novel polymerization reaction and polymerization process have certain difficulties, thus no substantial improvements on the polymerization methods and production processes for polyester are made, which fundamentally limits the development and application of polyester materials. Meanwhile, with the continuous development of society and progress of science and technology, people begin to need polyester materials with higher standards, such as non-toxic, more excellent mechanical performances, etc. And some special fields, such as aeronautics & astronautics, electronic communications, microelectronics, etc., have higher requirements for the material. Therefore, research and discovery of polyester materials with comprehensive performances such as uniform polymerization degree, high purity, good tolerance (acid, base) and good resistance to abrasion, etc. is one of the goals that the materials scientists strive to study.

The development of novel polyester type materials has been an important direction of industrial and academic endeavor, and Sharpless from Scripps Research Institute has developed a series of sulfate ester (amine) polymers by bulk polymerization in the presence of organic bases through the use of sulfonyl fluorine monomers and methyl silyl substituted monomers, (*Angew. Chem. Int. Ed.* 2014, 53, 9466-9470*; Nat. Chem.* 2017, 9, 1083-1088), wherein byproducts are methylsilyl alkyl fluorides, the current industrial use thereof is unknown, polluting the environment. In addition, although the method can obtain a variety of highly stable polysulfate ester (amine) polymers, however, the reaction process material cost is high, viscosity is higher at later stages of bulk polymerization in the engineering process, requiring a high temperature to melt and transport the material, energy consumption is high, which is not beneficial to the product industrialization.

INVENTION SUMMARY

The purpose of the present invention is to provide an economical and environmentally friendly synthesis method for high-performance bisphenol type polysulfate ester (amine) polymeric materials, which can be applied not only to synthesis of one-dimensional linear material, but also to provide a class of methods for constructing supercrosslinked planar two-dimensional or three-dimensional functional polymeric materials according to the design of monomer functionality, greatly expanding the synthesis and application space of the materials.

Another purpose of the present invention is to provide a high-performance bisphenol polysulfate ester (amine) polymeric material in response to problems present in existing polyester materials (e.g., stability, etc.).

The present invention discloses a synthesis method for sulfate ester (amine) type linker polymer, comprising:

- a monomer containing hydroxyl or amino group and a sulfuryl fluoride monomer proceeding a polycondensation reaction under a basic condition by one-pot process, wherein,
- the monomer containing hydroxyl group has a structural formula of $HO—X(—OH)_a$, wherein X is aromatic compound containing a heterocycle, aromatic compound containing no heterocycle, aliphatic hydrocarbon, amino acid, or amino acid derivative, a is an integer of 1 to 3,
- the monomer containing amino group has a structural formula of $H_2N—Z(—NH_2)_b$, wherein Z is aromatic compound containing a heterocycle, aromatic compound containing no heterocycle, aliphatic hydrocarbon, amino acid, or amino acid derivative, b is an integer of 1 to 3,
- the sulfuryl fluoride monomer has a structural formula of $FO_2S—Y—SO_2F$, wherein Y is aromatic compound, aliphatic hydrocarbon, amino acid, or amino acid derivative.

The synthesis method according to the present invention, wherein in the structural formula of the sulfuryl fluoride monomer $FO_2S—Y—SO_2F$, Y is preferably aromatic or hydrocarbon compound, which comprises at least one functional group selected from the group consisting of sulfonyl, carbonyl, amide, ether, and heteroaryl groups.

The synthesis method according to the present invention, wherein the monomer containing hydroxyl group is preferably bisphenol monomer, which preferably has a structural formula of

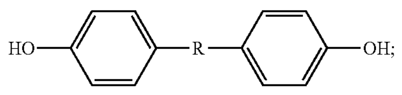

the sulfuryl fluoride monomer preferably has a structural formula of

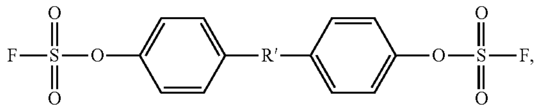

wherein, R is the same as or different from R', R and R' are preferably —S—, —O—, —$CH_2$, —$C(CH_3)_2$, —$C(CF_3)_2$, —C(O)—, —$S(O)_2$—, —C(O)NH—, or —C(O)O—.

The synthesis method according to the present invention, wherein the basic condition is preferably achieved by adding inorganic base.

The synthesis method according to the present invention, wherein the inorganic base and the sulfuryl fluoride monomer preferably have a molar ratio of 0.5:1~4:1.

The synthesis method according to the present invention, wherein the inorganic base is preferably at least one selected from the group consisting of potassium phosphate, sodium hydroxide, potassium hydroxide, sodium carbonate, potassium carbonate, sodium phosphate, and cesium carbonate.

The synthesis method according to the present invention, wherein the polycondensation reaction preferably occurs in the presence or absence of solvent.

The synthesis method according to the present invention, wherein the solvent is preferably at least one selected from the group consisting of sulfolane, N,N-dimethylformamide (DMF), N,N-dimethylacetamide (DEF), dimethyl sulfoxide (DMSO), N-methylpyrrolidone (NMP), chlorobenzene, xylene, trimethylbenzene, tetrahydrofuran, n-hexane, and cyclopentane, the solvent preferably comprises at least one water-carrying agent, the water-carrying agent is preferably chlorobenzene, xylene, trimethylbenzene, or n-hexane.

The synthesis method according to the present invention, wherein when the polycondensation reaction occurs in the absence of solvent, the polycondensation reaction preferably proceeds in the state that the monomer containing hydroxyl or amino group and the sulfuryl fluoride monomer are molten.

The synthesis method according to the present invention, wherein the synthesis method preferably proceeds end-capping reaction or end modification reaction after the polycondensation reaction is complete.

The synthesis method according to the present invention, wherein the end-capping reagent in the end-capping reaction is preferably at least one selected from the group consisting of chloromethane, phenol, phenol-based derivatives, and chlorobenzophenone monofunctional compound.

A sulfate ester (amine) type linker polymer prepared by the synthesis method according to the present invention.

Through the method of the present invention, not only one-dimensional linear polymers (such as, but not limited to, applications of engineering plastics, electrolytes, thin film polymers, etc.) can be constructed by bifunctional polycondensation in 2+2 mode, but also advanced planar and three-dimensional covalent sulfate amine ester materials (such as, materials for covalent organic porous energy storage, catalysis, and separation, or advanced device materials, etc., but the applications are not limited thereto) can be combinatorially constructed by 2+3 or 2+4, etc. This is indicated by the following formula.

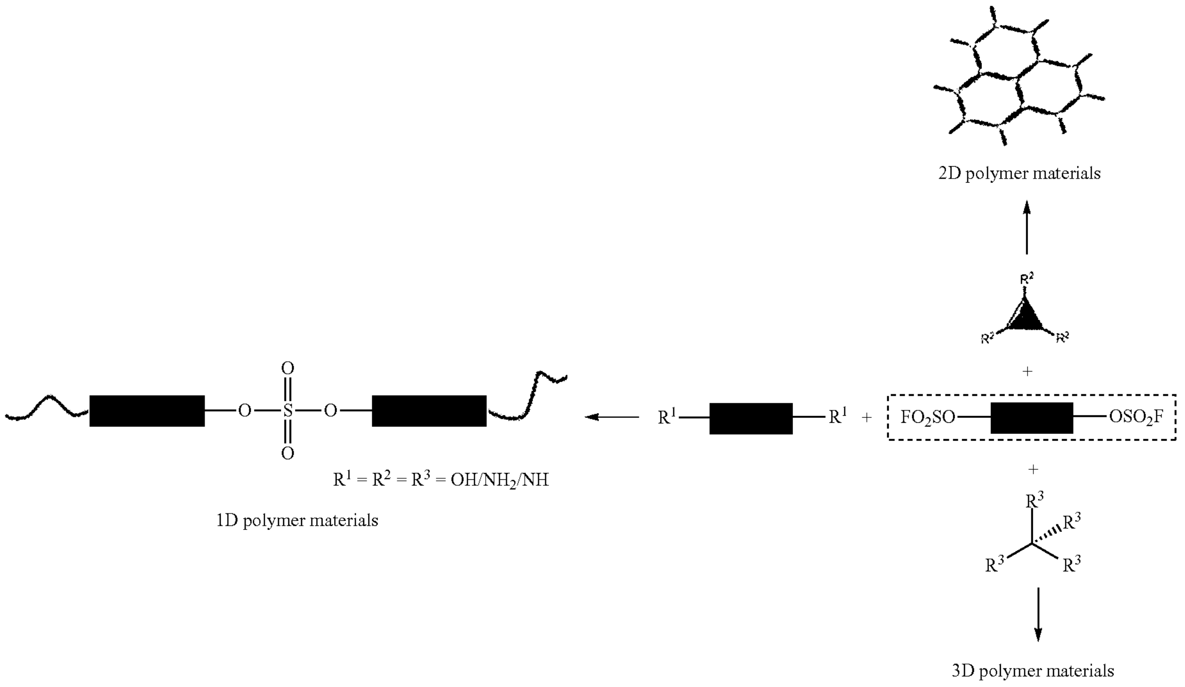

One-dimensional linear material polycondensation may not be limited to two-component polycondensation, and a multicomponent co-polycondensation could also proceed according to the material property requirements (but requiring at least one bisphenol- or alcohol-containing monomer and one sulfonyl fluoride monomer for co-polycondensation), the same monomer having at least one phenolic group and one sulfonyl fluoride group for polymerizing by self-polycondensation reaction is also included.

The sulfate ester (amine) linker polymers prepared by the synthesis method described in the present invention are preferably bisphenol type polysulfate ester (amine) polymers, the general formula of which can be briefly expressed as -A(—R-A)n-; A is $SO_2$, aza aromatic ring, R is aromatic or aliphatic structure, n>=1. They can be classified as following structures according to the difference of the monomer structures.

Note: type A and B are aromatic rigid polymer chain segments, C and D are flexible aliphatic chain segments, E and F are alternating aromatic and aliphatic polycondensation chain segments, G are self-polycondensation polymer chain segments, H and I are bisphenol type monomeric and monoarylic polycondensation chain segments.

A-I are all one-dimensional polymeric sulfate ester (amine) materials, J, H are planar or three-dimensional covalent sulfate ester (amine) materials constructed by the reaction of double and multiple reactive functional groups, which can be porous materials or hyperbranched polymeric materials and have important applications in the fields of electronic devices, separation and adsorption materials, etc.

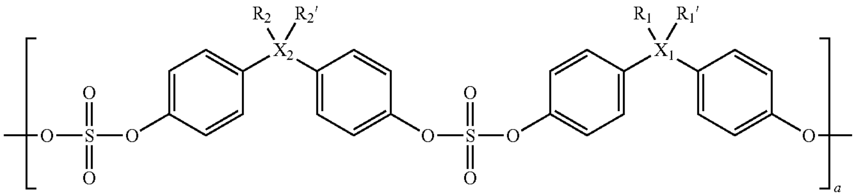

Wherein $X_2$, $X_1$ may be the same as or different from each other, $X_1$, $X_2$ may be hetero atom such as S, O, N, etc., and may also be C (when $R_1$, $R_2$, $R_1'$, $R_2'$, are $CH_3$, it is pure bisphenol A type polymer materials), $X_1(R_1R_1')$, $X_2(R_2R_2')$ may also be structures such as ketone, amide, etc., and comprise derivatives substituted in the aromatic rings, and be not limited to the functional groups mentioned in the patent.

A

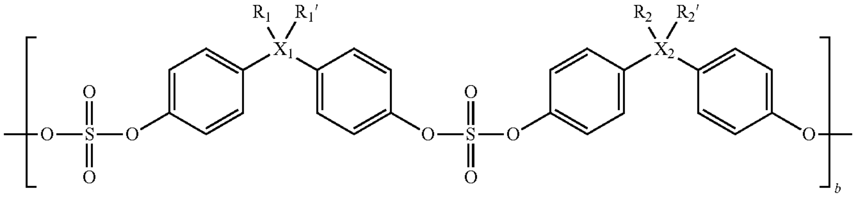

B

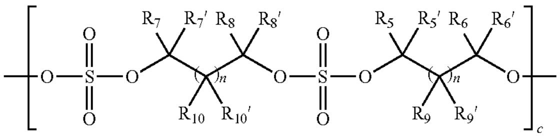

C

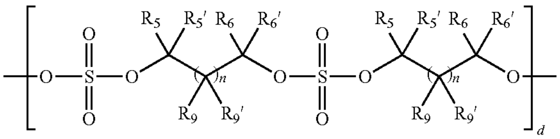

D

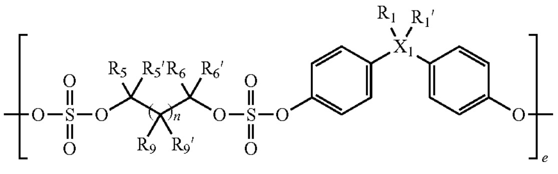

E

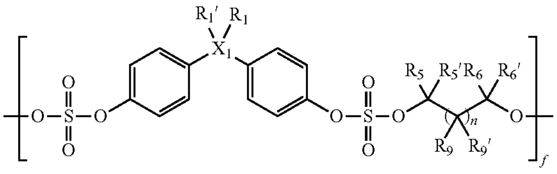

-continued

F

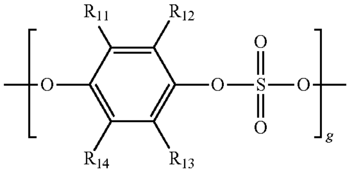

G

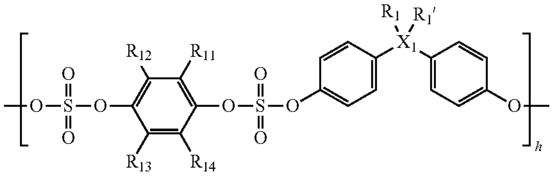

H

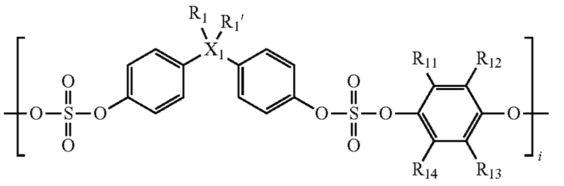

I

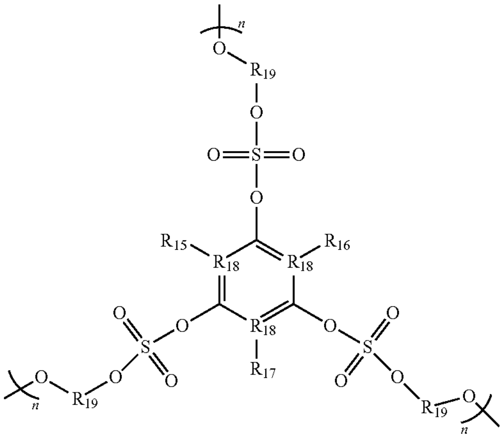

J

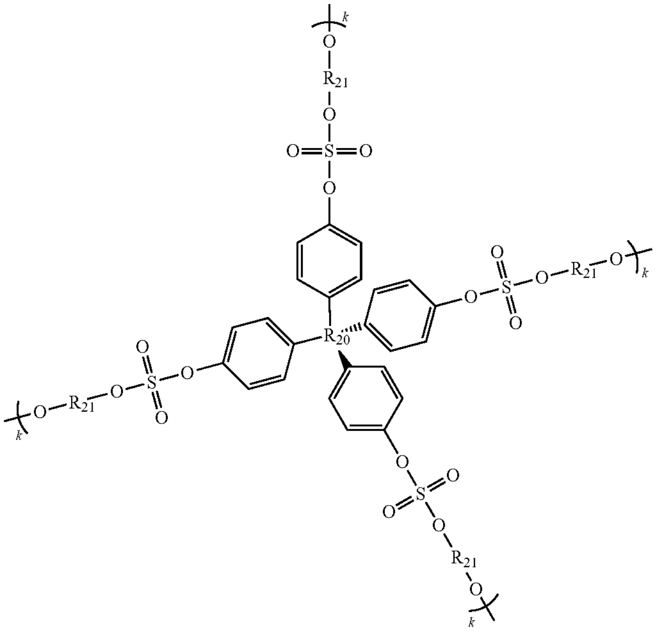

Polysulfate ester (amine) ester-containing polymers are synthesized by reacting bisphenols protected by sulfonyl fluoride with bisphenols having the corresponding reaction groups (either alcohols or amines) under a basic condition at a temperature of 25 to 300° C. for 1 to 48 hours. The one-dimensional linear polymeric products obtained by this method are precipitated by a precipitant such as water (methanol or ethanol, isopropanol, etc.) to give polysulfate ester (amine) polymers. In the case of two- or three-dimensional materials reacted by polyfunctional groups, the materials can be obtained by direct filtration, washing.

The chemical formula for the above polymerization method is expressed as follows (IB: inorganic base):
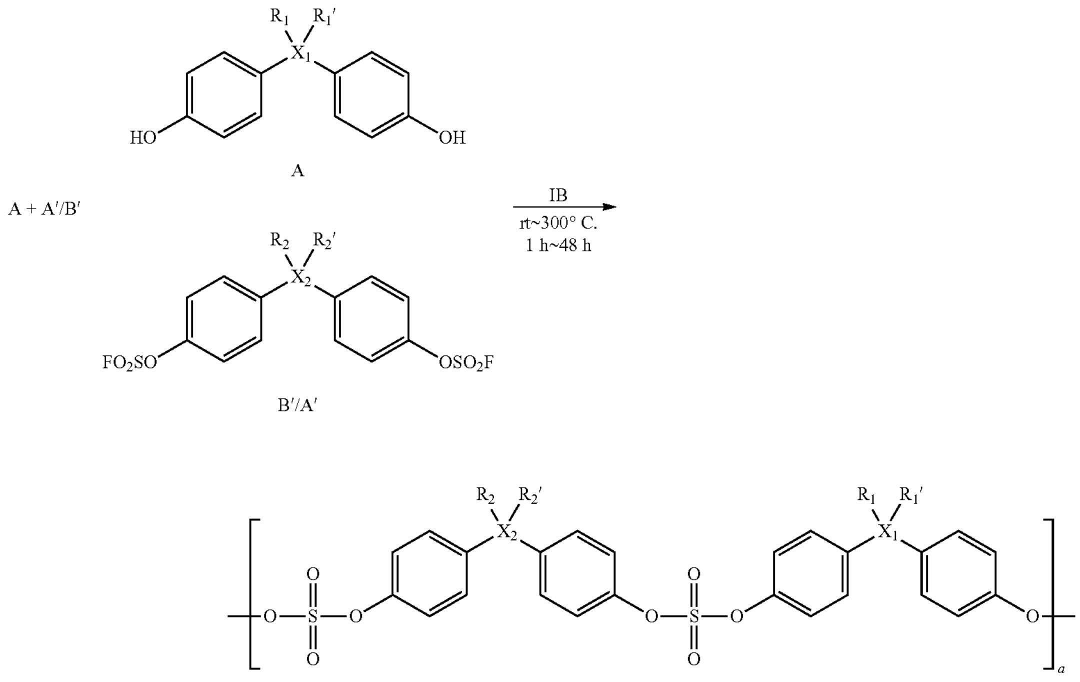
A' = B' when $X_2 = X_1$ and $R_2 = R_1$, $R_2' = R_1'$.
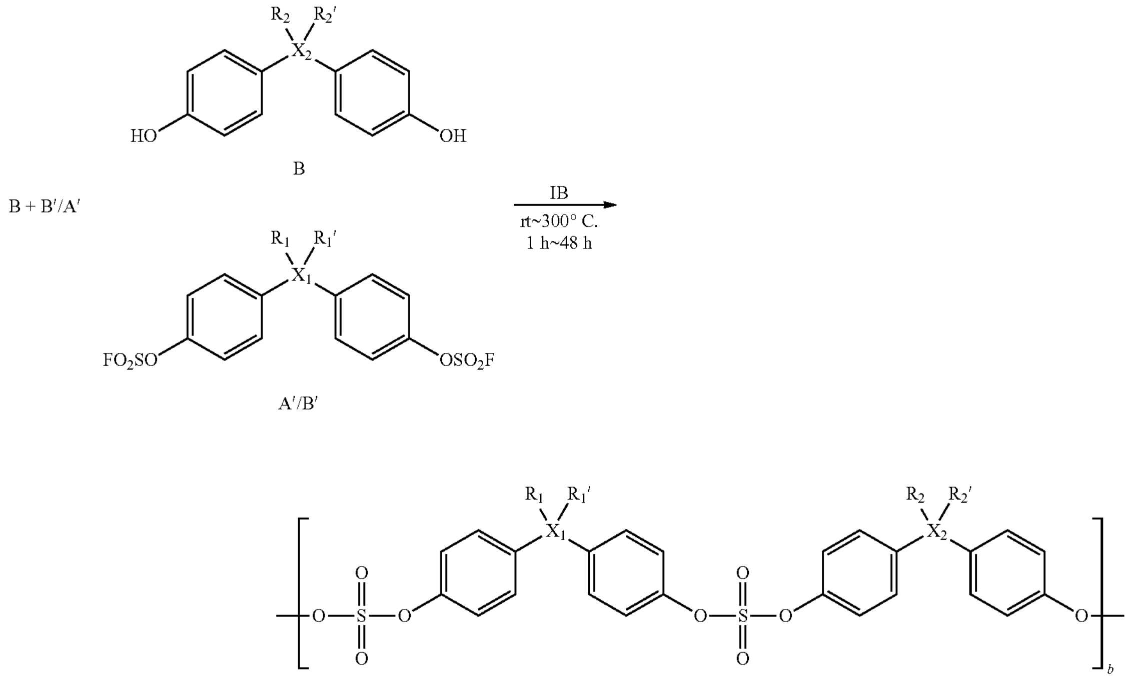
A' = B' when $X_1 = X_2$ and $R_1 = R_2$, $R_1' = R_2'$.

-continued
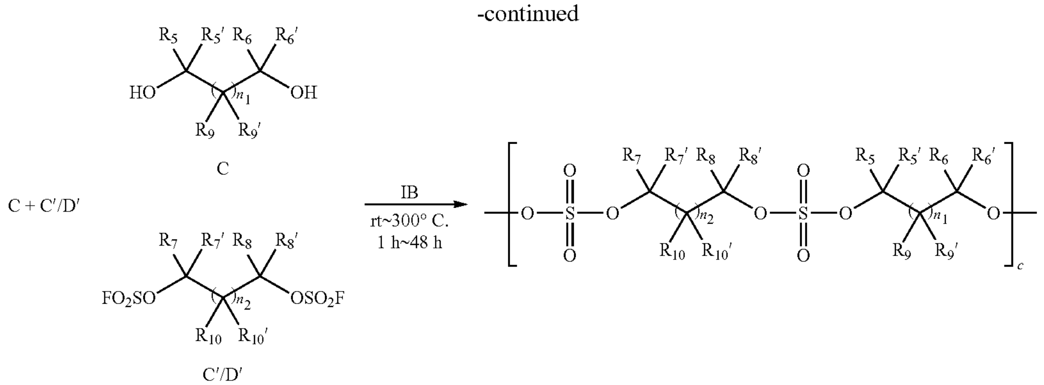
C + C'/D'
C
C'/D'
C' = D' when $n_2 = n_1$, and $R_7 = R_5$, $R_7' = R_5'$, $R_8 = R_6$, $R_8' = R_6'$, $R_{10} = R_9$, $R_{10}' = R_9'$.
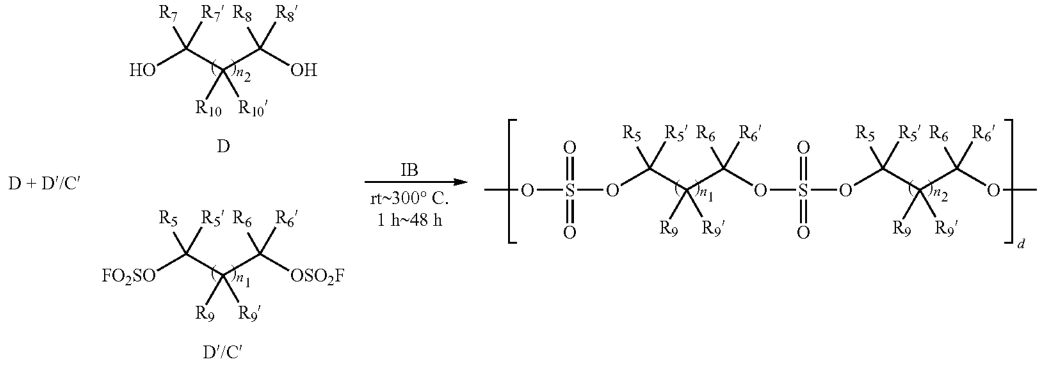
D + D'/C'
D
D'/C'
D' = C' when $n_1 = n_2$, and $R_5 = R_7$, $R_5' = R_7'$, $R_6 = R_8$, $R_6' = R_8'$, $R_9 = R_{10}$, $R_9' = R_{10}'$.
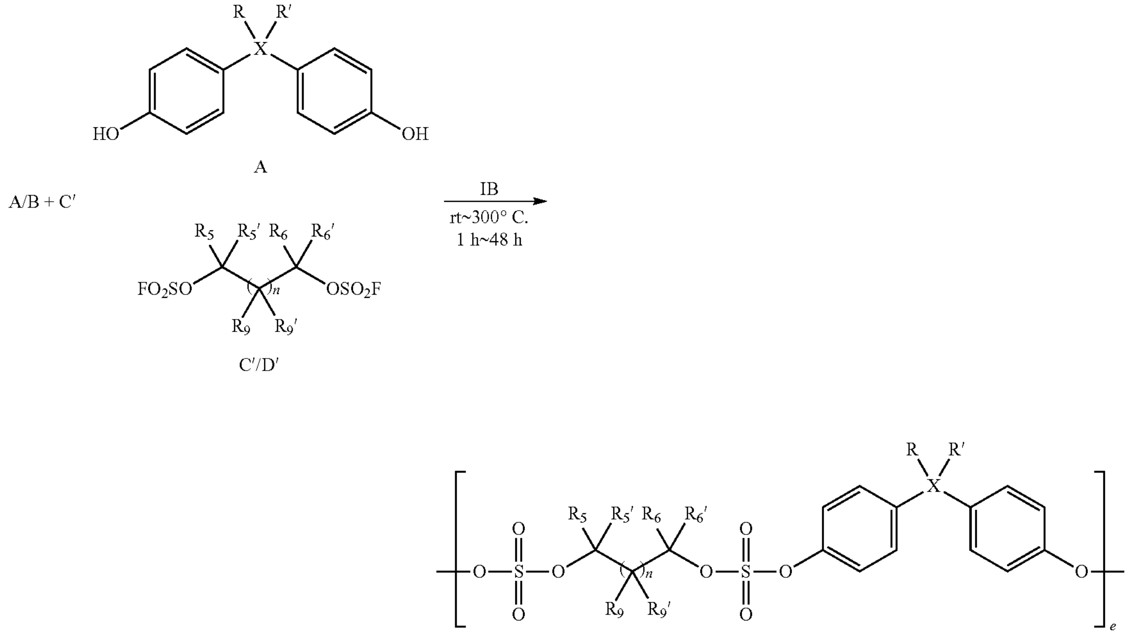
A/B + C'
A
C'/D'
A when $X = X_1$, and $R = R_1$, $R' = R_1'$; B when $X = X_2$, and $R = R_2$, $R' = R_2'$.

-continued
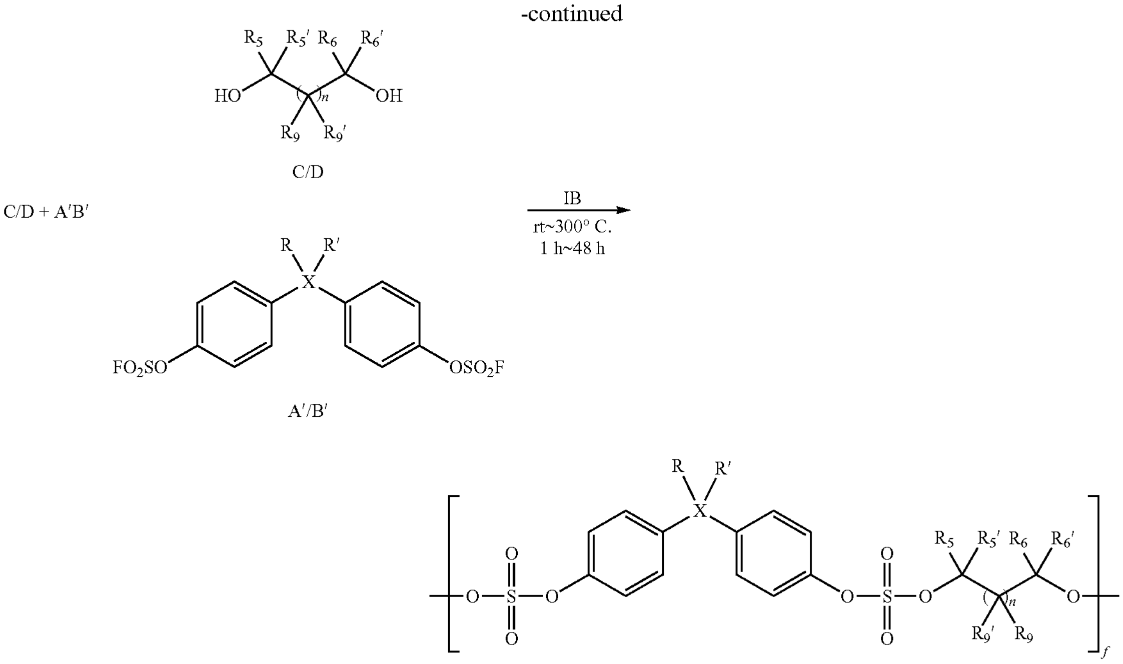
C/D
A'/B'
$D = C$ when $n = n_1 = n_2$, and $R_5 = R_7$, $R_5' = R_7'$, $R_6 = R_8$, $R_6' = R_8'$, $R_9 = R_{10}$, $R_9' = R_{10}'$;
$A'$ when $X = X_1$, and $R = R_1$, $R' = R_1'$; $B'$ when $X = X_2$, and $R = R_2$, $R' = R_2'$.
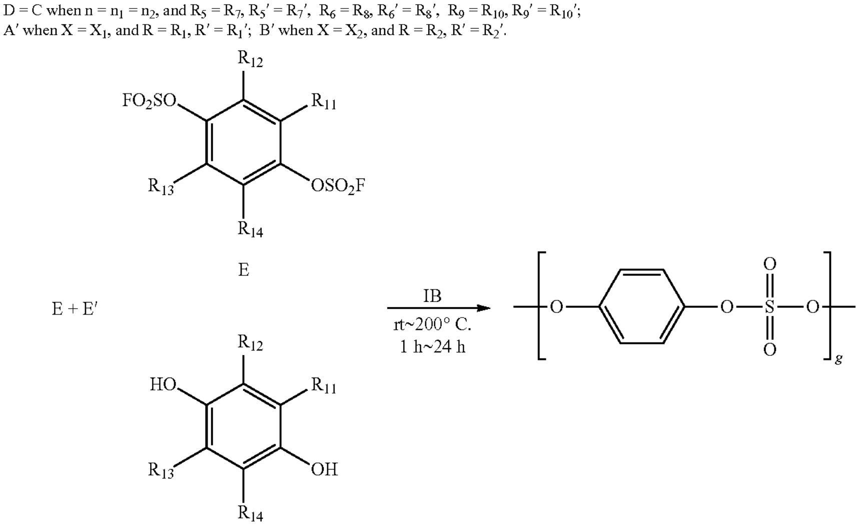
E
E'
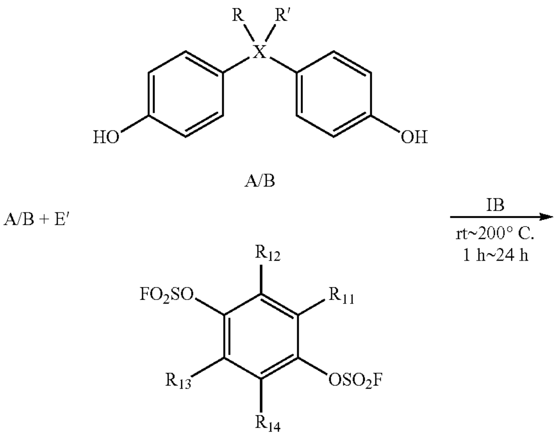
A/B
E'

-continued
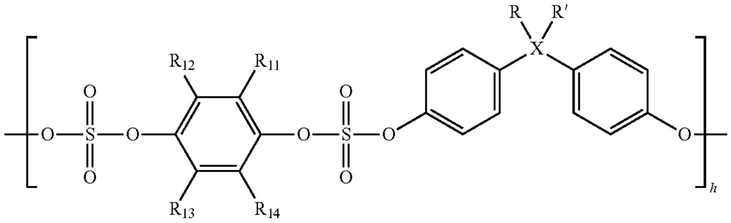
A when $X = X_1$, and $R = R_1$, $R' = R_1'$; B when $X = X_2$, and $R = R_2$, $R' = R_2'$.
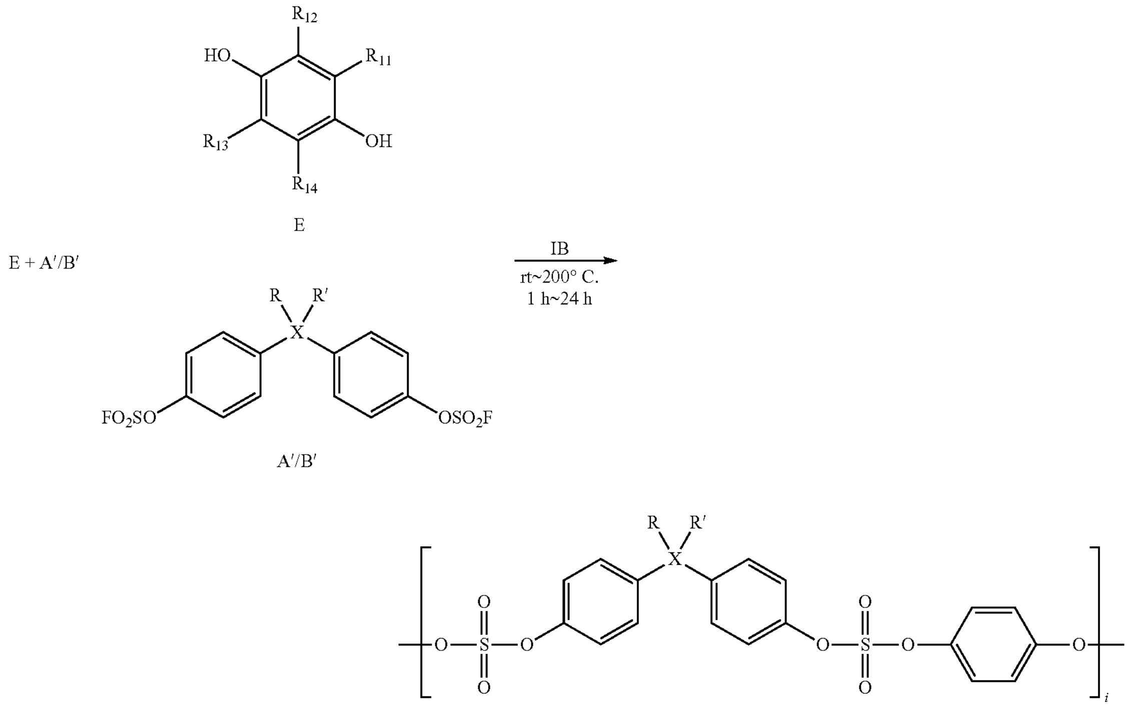
A' when $X = X_1$, and $R = R_1$, $R' = R_1'$; B' when $X = X_2$, and $R = R_2$, $R' = R_2'$.
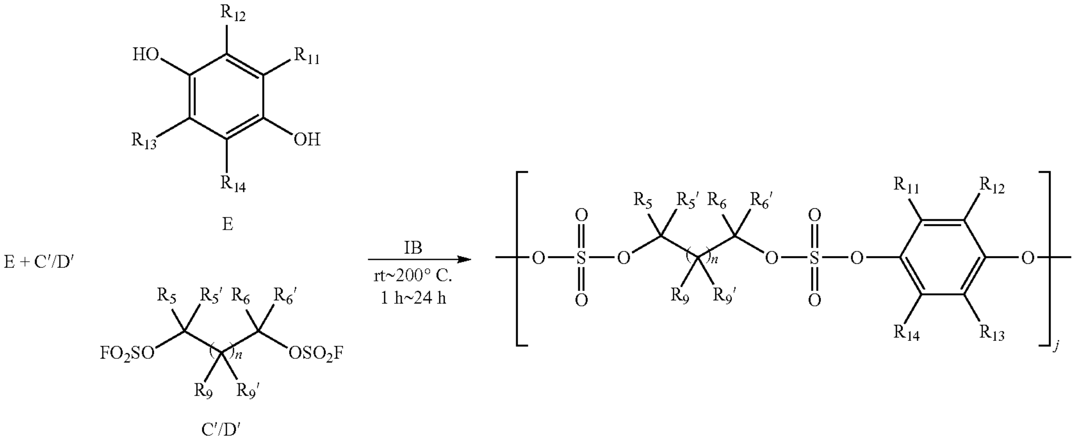
C when $n = n_1$,; D when $n = n_2$ and $R_5 = R_7$, $R_5' = R_7'$, $R_6 = R_8$, $R_6' = R_8'$, $R_9 = R_{10}$, $R_9' = R_{10}'$.

-continued

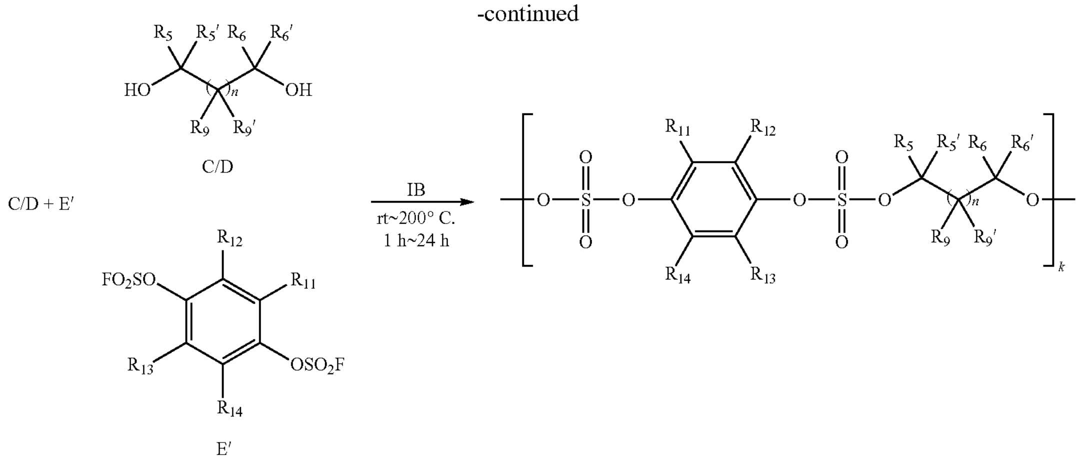

C/D + E'

C/D

E'

C when $n = n_1$,; D when $n = n_2$ and $R_5 = R_7$, $R_5' = R_7'$, $R_6 = R_8$, $R_6' = R_8'$, $R_9 = R_{10}$, $R_9' = R_{10}'$.

In each of the above formulas, a, b, c, d, e, f, g, h, i, j, k=1, 2, 3, 4 . . . ;

$n_1$, $n_1$=0, 1, 2 . . . 8;

$R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$, $R_9$, $R_9'$, $R_{10}$, $R_{10}'$, $R_{11}$, $R_{12}$, $R_{13}$, $R_{14}$ is -Me (methyl), -Et (ethyl), -Ph (phenyl), -iPr (i-propyl), —H (hydrogen), or ═O (double bond oxygen); $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$, $R_9$, $R_9'$, $R_{10}$, $R_{10}'$, $R_{11}$, $R_{12}$, $R_{13}$, $R_{14}$ may be the same as or different from each other;

$X_1$, $X_2$ is —C(carbon), —Si (silicon), —S(sulfur), or —O (oxygen); $X_1$, $X_2$ may be the same as or different from each other.

$R_{15}$, $R_{16}$, $R_{17}$ may be the same as or different from each other, may be groups such as hydrocarbons, amino acids, aldehydes, carboxylic acids, esters, and even aromatic compounds, etc., however, if porous materials are needed to be synthesized, then $R_{15}$, $R_{16}$, $R_{17}$ need to be short-chain structure to avoid too large groups to block the pores; $R_{18}$ may be C or N. In the case of N atom, it is usually used as novel N-rich materials such as flame retardant materials, photovoltaic materials, etc.

$R_{19}$, $R_{21}$ may be aromatics, hydrocarbons, amino acid derivatives, azacyclic compounds, etc.

$R_{20}$ is C (carbon) or Si (silicon) element, or compound containing an adamantane tetrahedral structure.

The bisphenol protected by sulfonyl fluorides has a structural formula as follows:

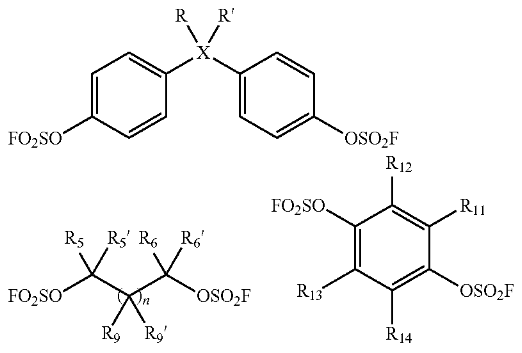

In each of the above formulas, R, R', $R_5$, $R_5'$, $R_6$, $R_6'$, $R_9$, $R_9'$, $R_{11}$, $R_{12}$, $R_{13}$, $R_{14}$ is -Me (methyl), -Et (ethyl), -Ph (phenyl), -iPr (i-propyl), —H (hydrogen), or ═O (double bond oxygen); R, R', $R_5$, $R_5'$, $R_6$, $R_6'$, $R_9$, $R_9'$, $R_{11}$, $R_{12}$, $R_{13}$, $R_{14}$ may be the same as or different from each other;

X is —C(carbon), —Si (silicon), —S(sulfur), or —O (oxygen);

n=0, 1, 2, . . . , 8.

Synthetic reactions of polysulfate ester (amine) polymers containing 4,4-dihydroxydiphenyl can be carried out in both solvent and solvent-free methods. If the reaction is carried out in solvent, the solvent can be sulfolane, N-methylpyrrolidone (NMP), N,N-dimethylformamide (DMF), N,N-dimethylacetamide (DMAC), or dimethyl sulfoxide (DMSO), etc.; If the reaction is carried out in no solvent, bisoxy sulfonyl fluoride containing 4,4-dihydroxy-diphenyl and bisphenol or diamine containing 4,4-dihydroxy-diphenyl are polymerized after being sufficient molten at a certain temperature.

Polymerization reaction time can be regulated in 0.5~48 hours according to different raw material requirements and the presence or absence of reaction solvent, and the reaction can be terminated by adding a precipitant so as to adjust polymerization degree of the product.

In addition to the molecular weight being regulated through the reaction time, adding molecular weight regulators, such as monophenolic compounds, monoxasulfonyl fluoride compounds, etc., or adding end-capping reagent, which may be selected from compounds containing non-restrictive reaction group halogens such as chloromethane, chlorosilane, F-substituted aromatic hydrocarbons, etc., or monophenolic compounds, alcohol compounds, to cap the ends at the time of terminating the reaction, may be employed, and coupling agents, functional groups with functionality, etc. may also be added according to the material application direction and the requirements for performance to construct structural and functional materials.

The synthesized products are identified by NMR, infrared spectroscopy, high-resolution mass spectrometry, etc., and analyzed by gel chromatography, showing that the target product, polysulfate ester (amine) polymer containing 4,4-dihydroxy-diphenyl, is successfully synthesized.

II. Performances of Bisphenol Type Polysulfate Ester

1. Indicators of Physical Performances

The bisphenol polysulfate ester compounds of the present invention are white or dark brown, transparent or translucent thermoplastic solid materials.

The hydrocarbon type polysulfate ester compounds of the present invention are white, transparent or translucent thermoplastic solid materials (gel or liquid in the case of oligomers or star structures with small molecular weight).

The three-dimensional or two-dimensional materials of the present invention are solid insoluble materials, which can be obtained directly through filtration, washing. Such materials can be used as composite film fillers, or other applications. If they are materials with a high specific surface area, then they can be used as separation, adsorption materials, etc.

2. Indicators of Chemical Performances

The bisphenol polysulfate ester compounds of the present invention have a polymerization degree of 10~1000 and have good resistance to base and hydrolysis.

The present invention has the following advantageous effects:

As compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances, as compared to the most widely used bisphenol A polycarbonate PC, they are much higher than the bisphenol A polycarbonate PC in terms of polymerization degree, mechanical performances, tolerance performances, and abrasion resistance performances, thereby having a broad application prospects in the fields of aviation, communications, electronics, and microelectronics industry.

MODE FOR CARRYING OUT THE INVENTION

Figure 1:
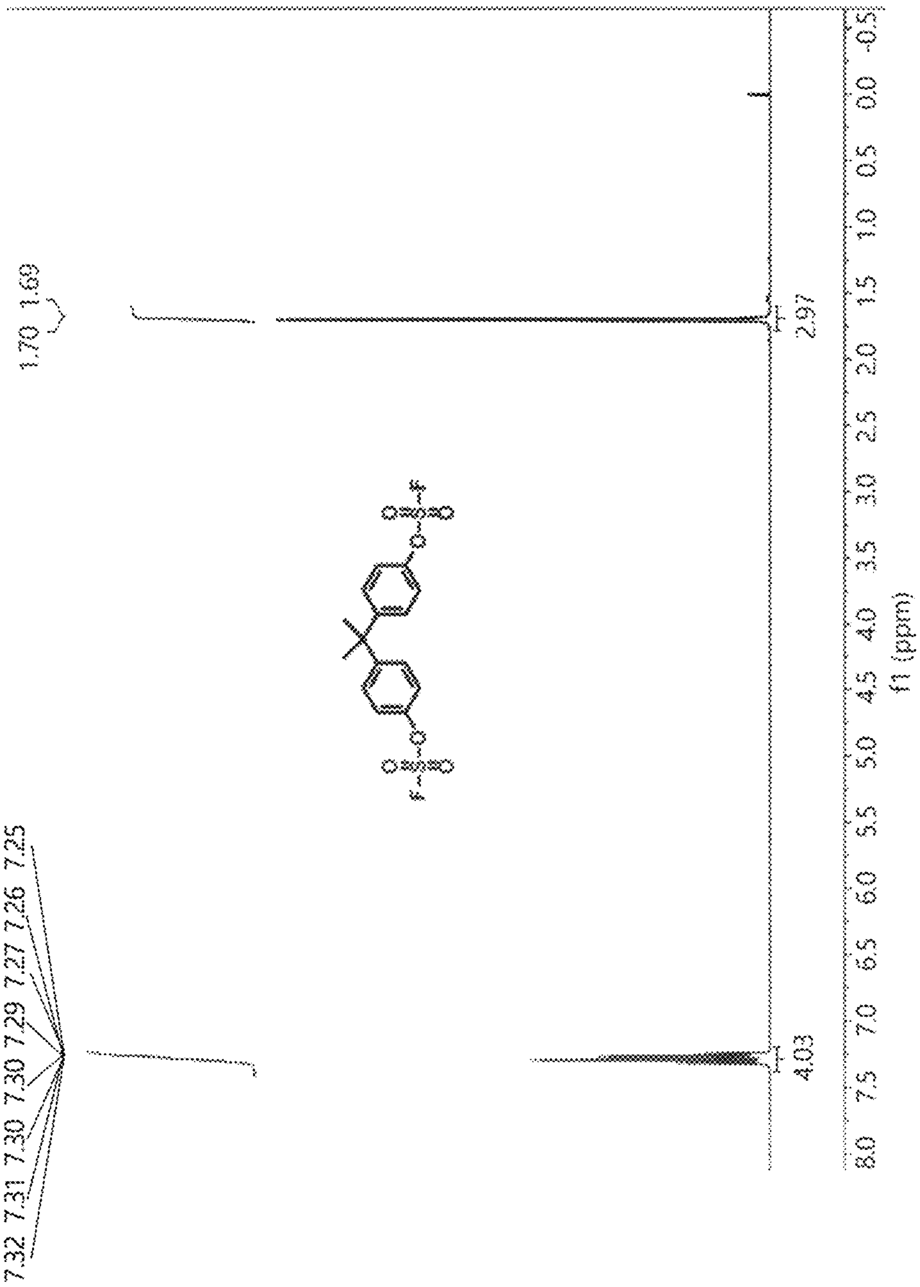
FIG. 1 is the $^{1}$H-NMR spectra of bisphenol A type sulfuryl fluoride monomer.
Figure 2:
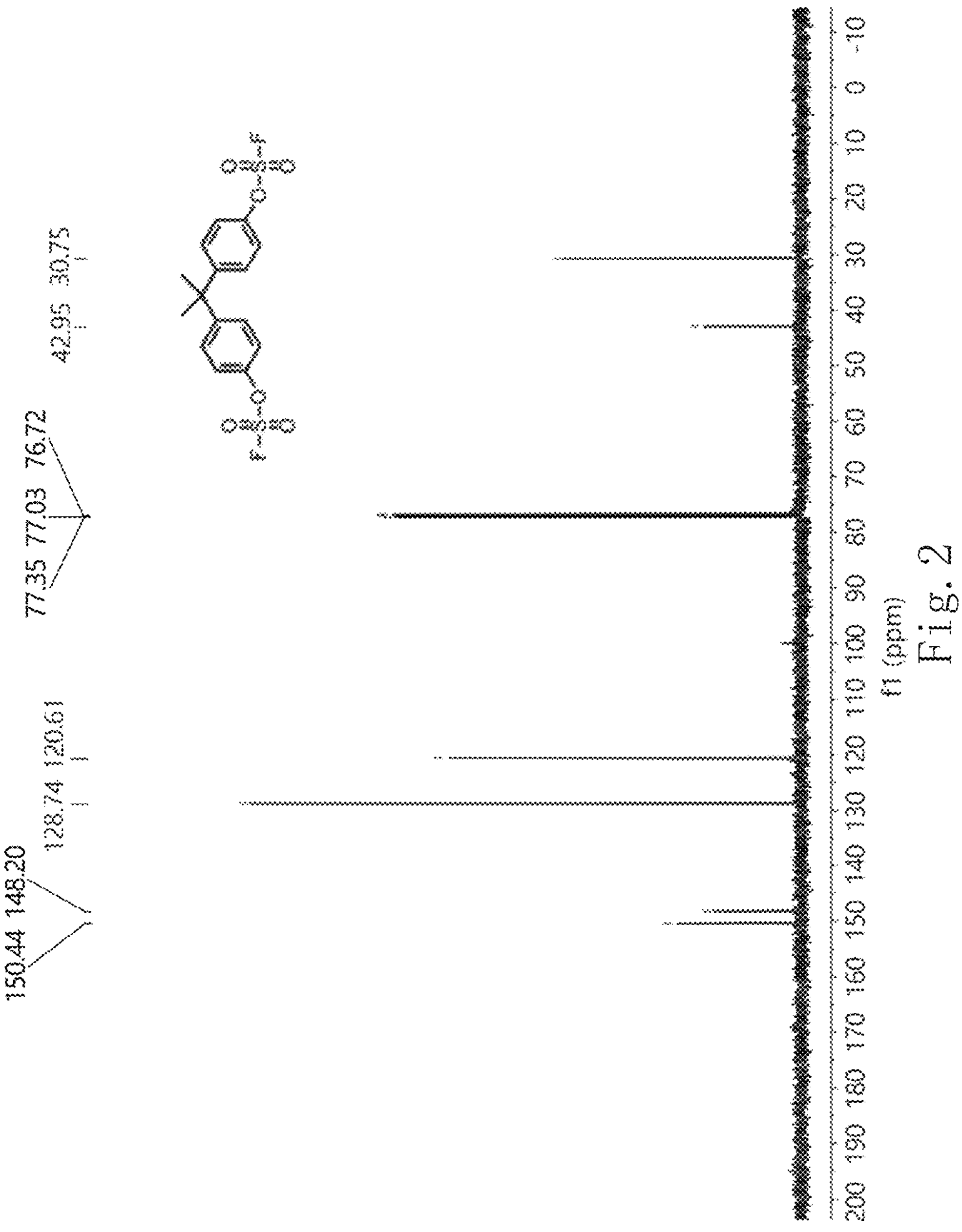
FIG. 2 is the $^{13}$C-NMR spectra of bisphenol A type sulfuryl fluoride monomer.
Figure 3:
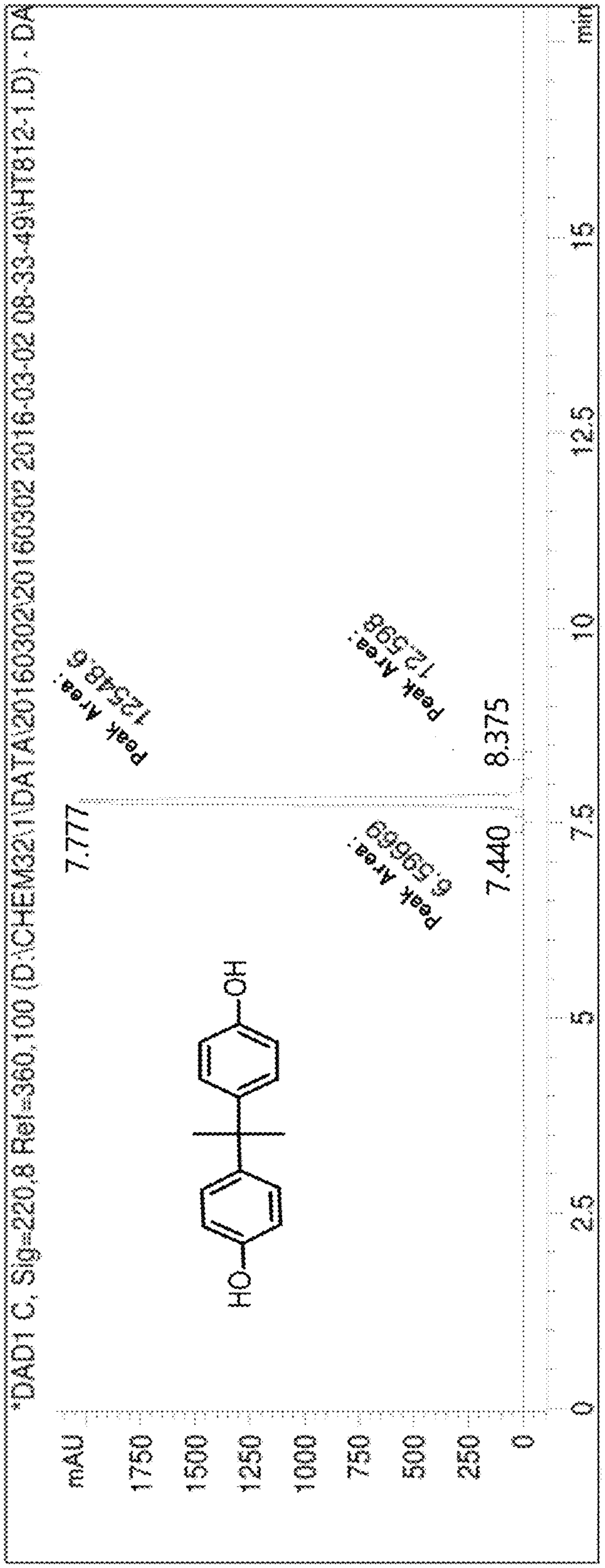
FIG. 3 is the schematic diagram of the purity analysis result of bisphenol A by HPLC.
Figure 4:
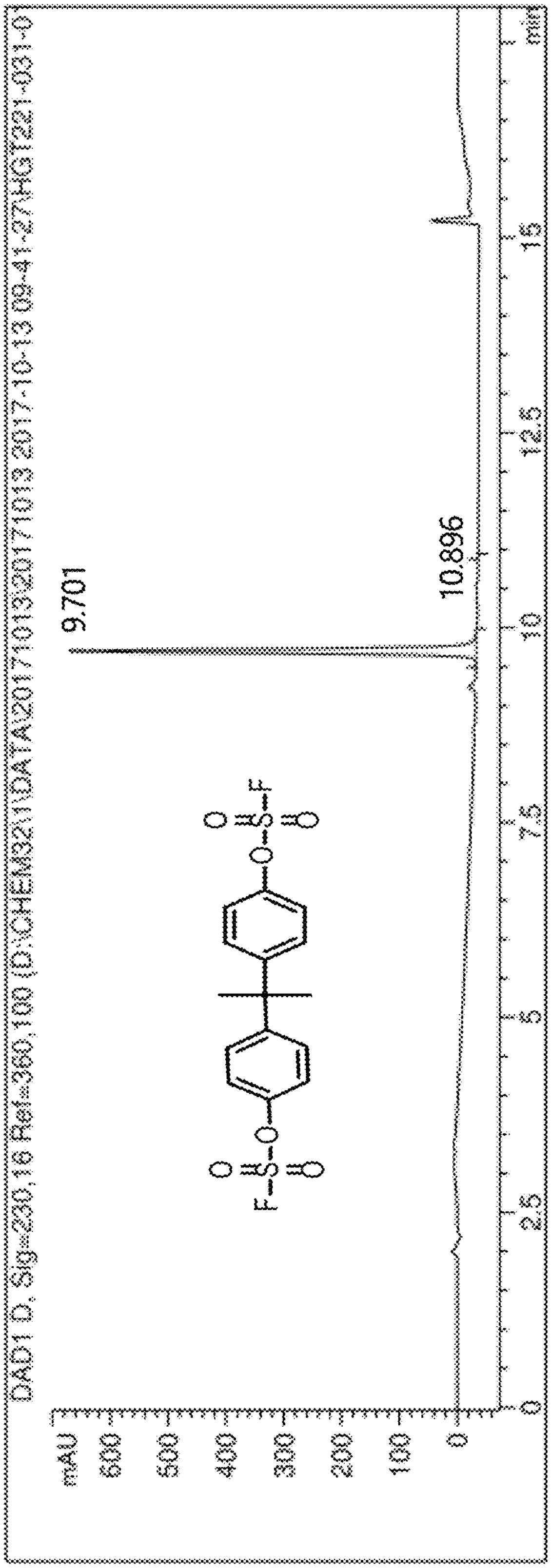
FIG. 4 is the schematic diagram of the HPLC analysis result of bisphenol A type sulfuryl fluoride monomer.
Figure 5:
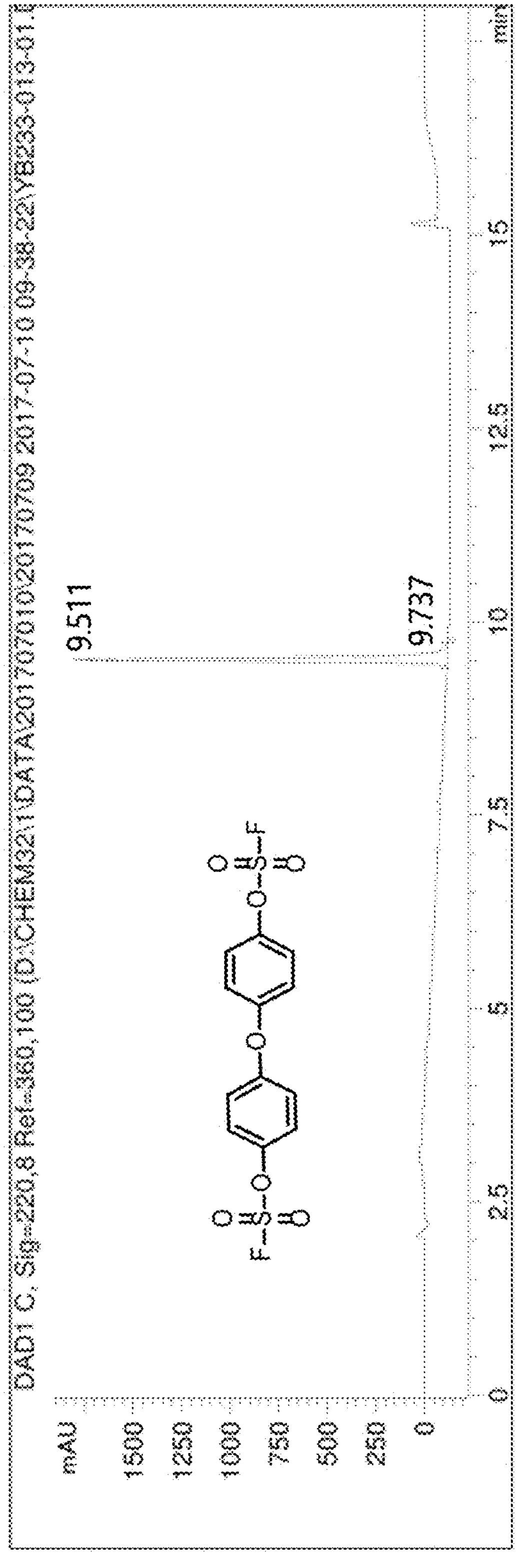
FIG. 5 is the schematic diagram of the HPLC analysis result of diphenyl ether type sulfuryl fluoride monomer.
Figure 6:
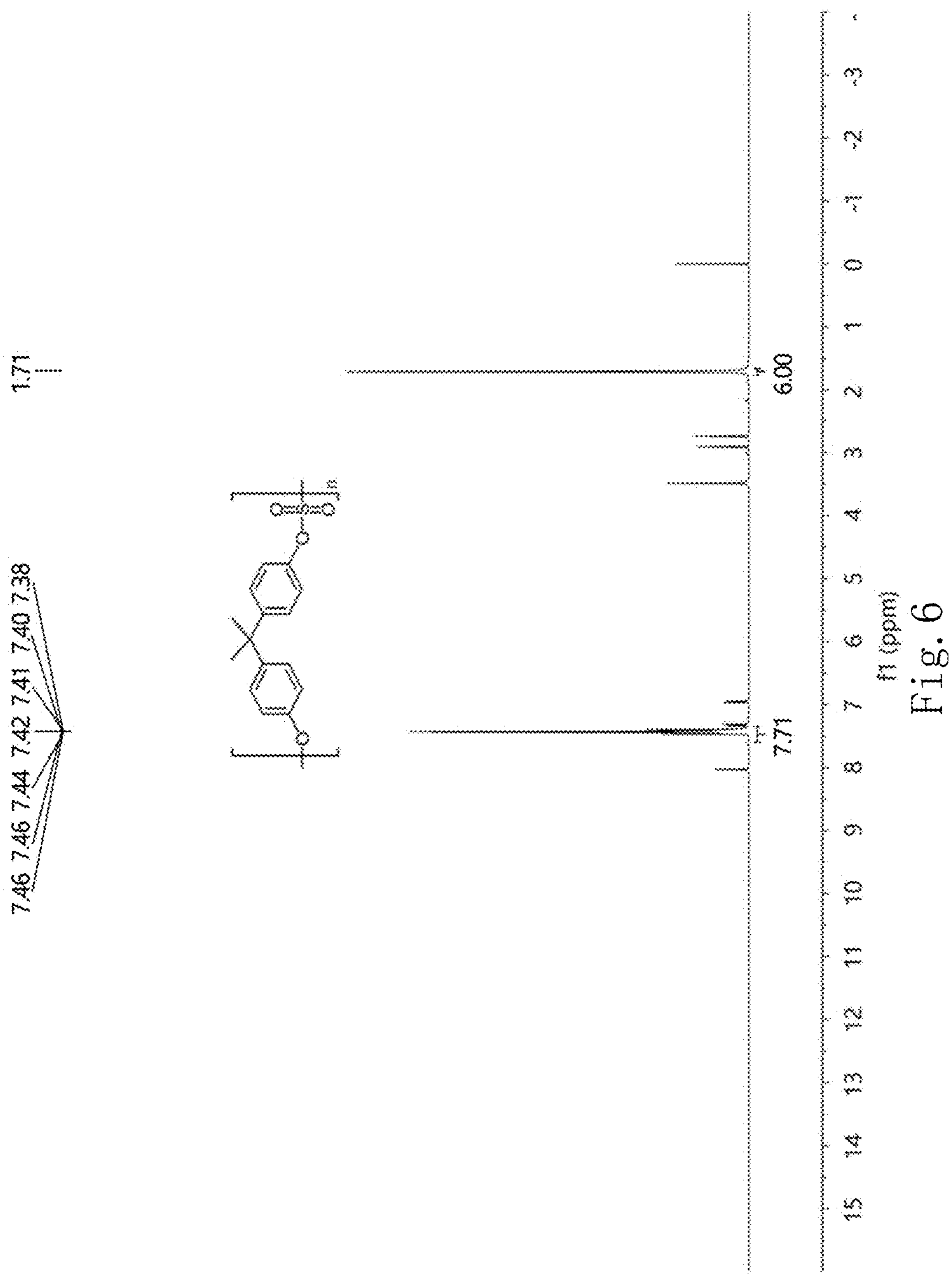
FIG. 6 is the $^{1}$H-NMR spectra of PSE-1.
Figure 7:
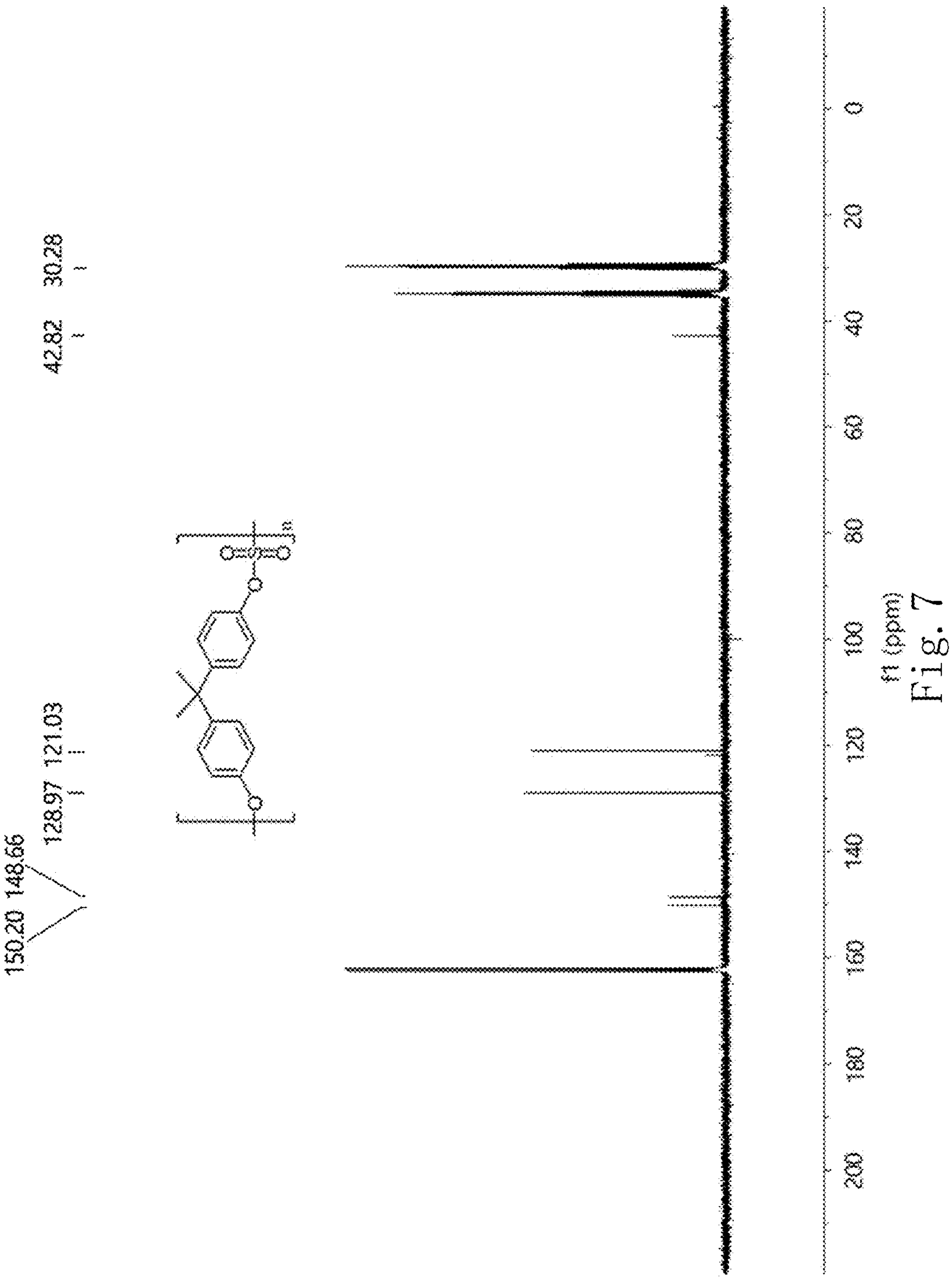
FIG. 7 is the $^{13}$C-NMR spectra of PSE-1.
Figure 8:
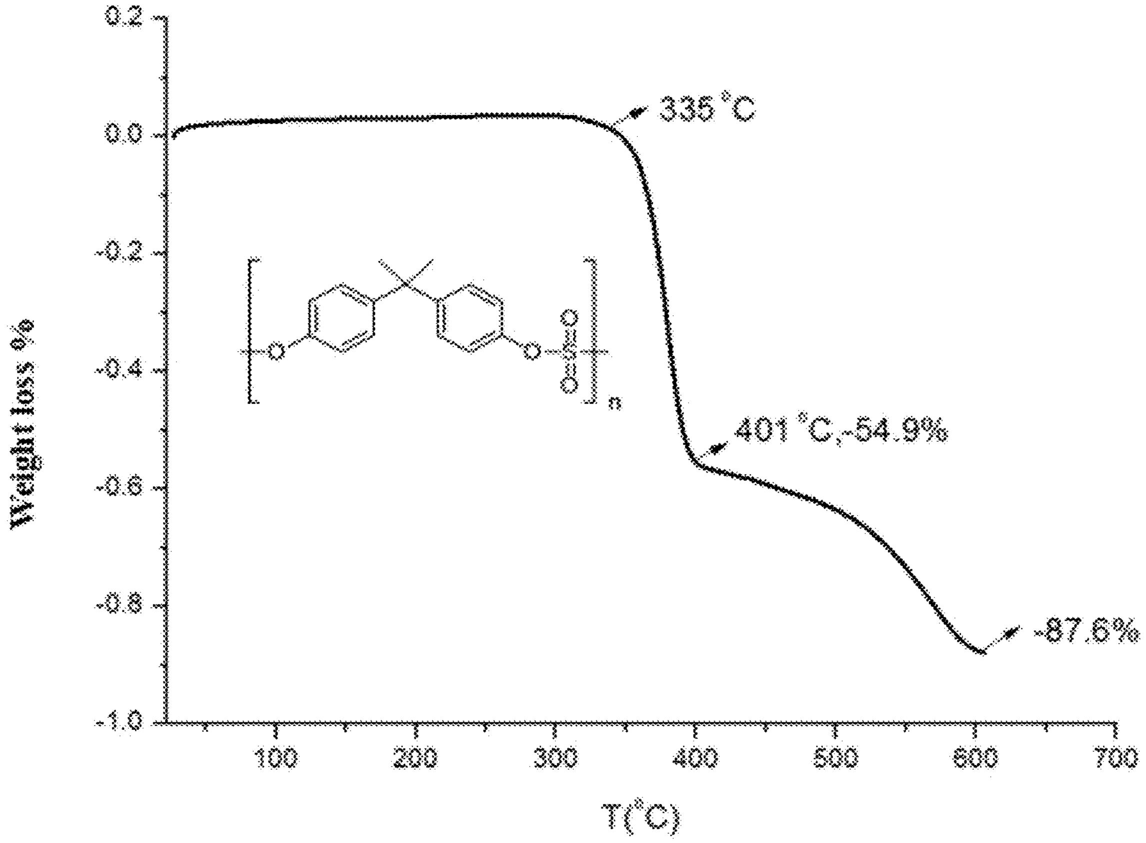
FIG. 8 is the schematic diagram of the TGA analysis result of PSE.
Figure 9:
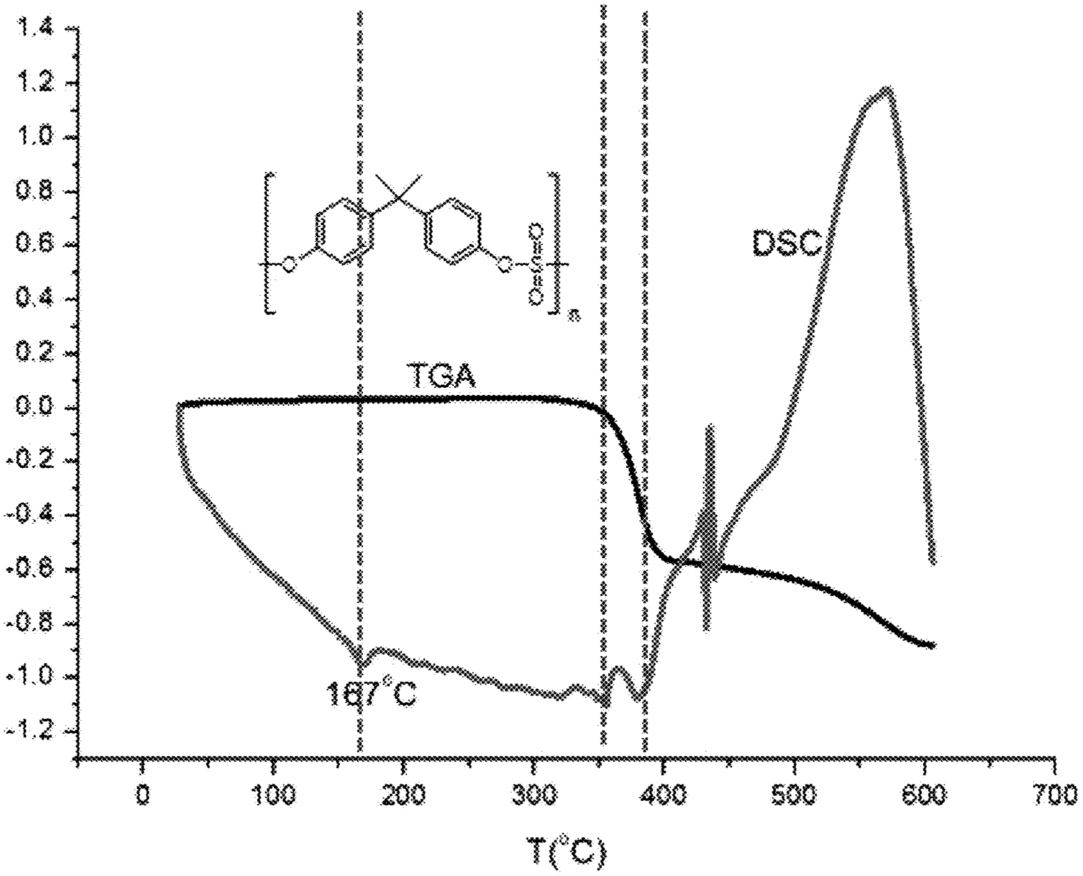
FIG. 9 is the schematic diagram of the TGA and DSC analysis results of PSE.
Figure 10:
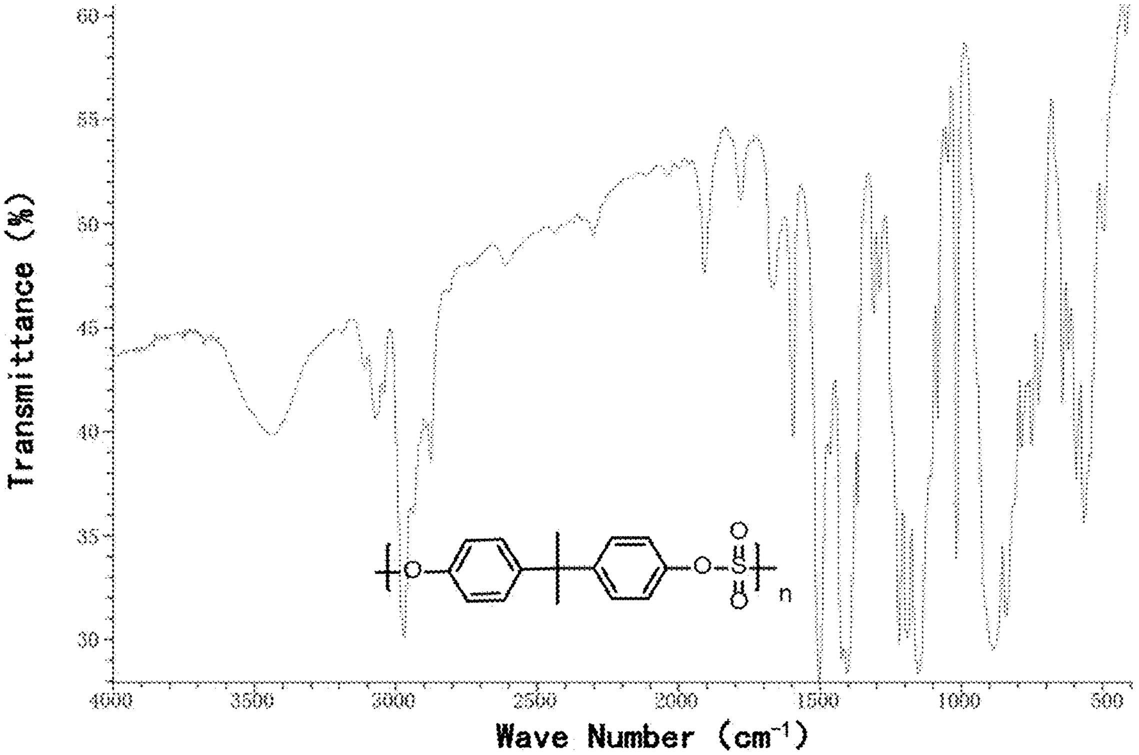
FIG. 10 is the spectra of the FTIR analysis of PSE-1.
Figure 11:
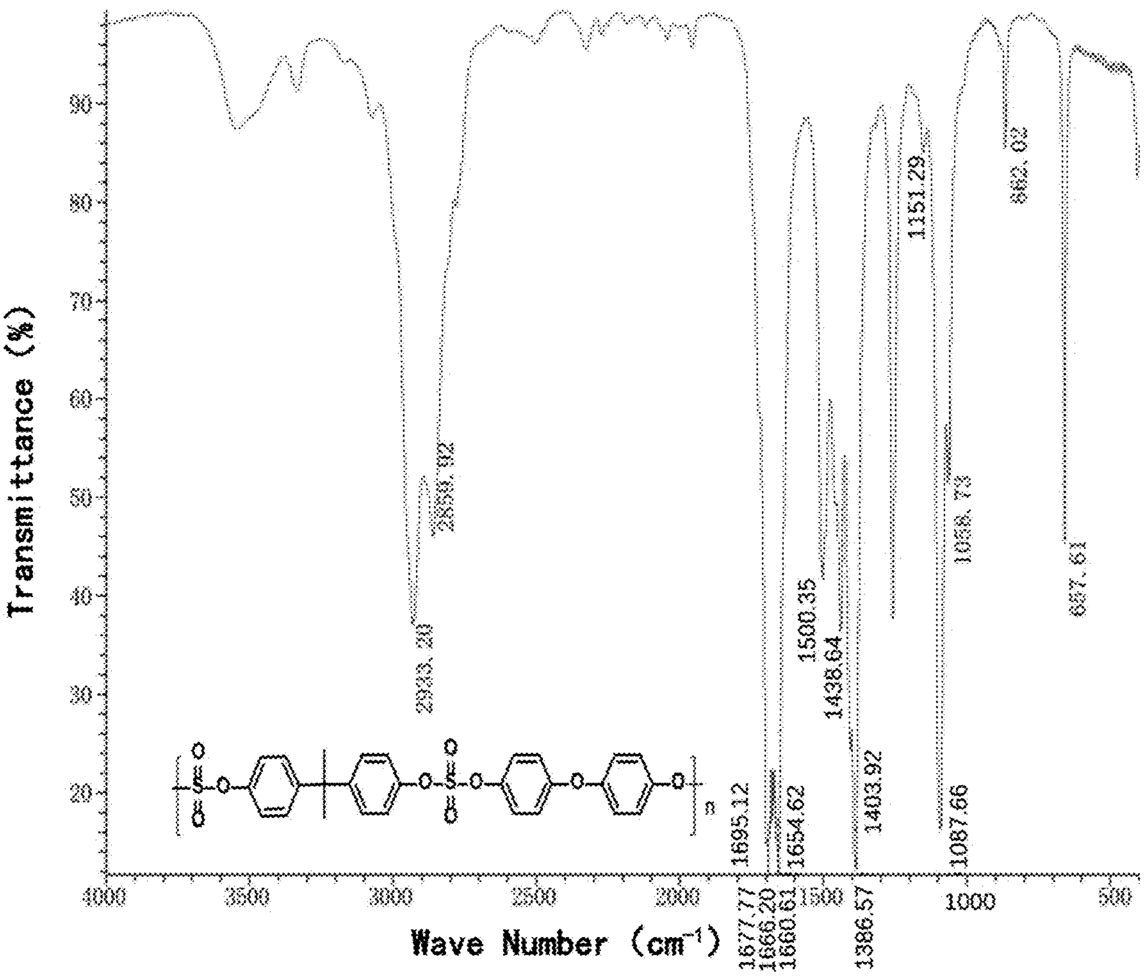
FIG. 11 is the spectra of the FTIR analysis of BPA-B.

Syntheses and performances of the polysulfate ester (amine) compounds containing 4,4-dihydroxy-diphenyl involved in the present invention are further described by specific examples as follows.

Example 1. Synthesis of polysulfate ester-1 containing 4,4-dihydroxy-diphenyl with polymerization degree of 5-1000

(1) Synthesis of bisphenol protected by sulfonyl fluoride: 228 g (1 mol) of bisphenol A was dissolved in 100 mL of dichloromethane or chloroform, 24.2 g (2.40 mol) of triethylamine was added, and sulfonyl fluoride gas was carefully and continuously introduced. The reaction was carried out at room temperature for 12 hours, and after the reaction was complete, 388 g of bisphenol A protected by sulfonyl fluoride (1,4-phenylene bis(sulfuroidate)), a dark brown solid, could be obtained through being simply concentrated, filtered, and washed, yield: 99%.

NMR analysis data of the synthesized product: $^{1}$H NMR (400 MHz, $CDCl_3$) δ 7.36-7.15 (m, 8H), 1.69 (s, 6H). 13C NMR (400 MHz, $CDCl_3$) δ 150.44, 148.20, 128.74, 120.61, 42.95, 30.75

The synthesized product has a structural formula as follows:

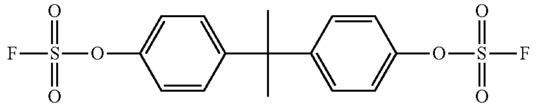 [SMILES: CC(C)(c1ccc(OS(=O)(=O)F)cc1)c1ccc(OS(=O)(=O)F)cc1]

Experiments have shown that, in the above reaction process, when dichloroethane, ethyl acetate, acetonitrile, toluene, or dioxane are used as solvents; the organic amine uses trimethylamine (TMA), tripropylamine, tributylamine (TBA), diethylamine (DEA), diisopropylethylamine, diisopropylamine (DIPA); ammonia, ammonia gas can also be used; pyridine, piperidine, 1,8-diazabicyclo[5.4.0]undec-7-ene (DBU), 1,4-diazabicyclo[2.2.2]octane (DABCO), 4-dimethylaminopyridine (DMAP), dimethylcyclohexylamine (DMCHA), all can deliver bisphenol A protected by sulfonyl fluoride in different yields (58% to 99%).

(1) Synthesis of Bisphenol Type Polysulfate Ester-1 (PSE-1) with Polymerization Degree of 5~500

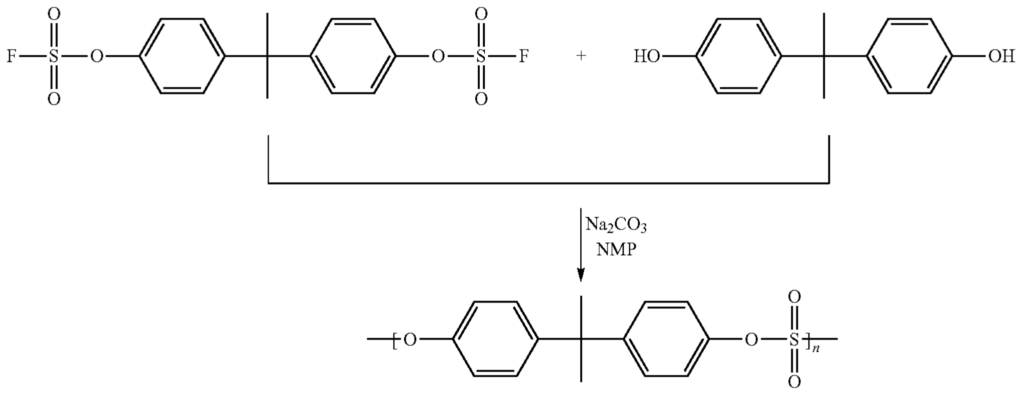

PSE-1

392 g (1 mol) of the above prepared bisphenol A protected by sulfonyl fluoride and 228 g (1 mol) of bisphenol A with an equal molar amount, 760 g of NMP solvent, and 100 g of toluene were completely dissolved by heating, then 1.2 molar amount (1.2 mol) of inorganic base sodium carbonate was added, and the mixture was reacted at 150° C. with mechanical stirring for 1 hour, and poured into water to terminate the reaction. The precipitated polymerization product is separated, extracted by ethanol, and dried to obtain a white solid PSE-1 containing 4,4-dihydroxy-diphenyl: 556 g, yield: 99%. If ends need to be capped, after the molecular weight of polycondensation reaches a certain value, the end-capping reagent chloromethane solution (0.05 mol) is added, and reacted for 15 min, then poured into water to terminate and precipitate the product. After the product is separated, the end-capped PSE-1 product is obtained through being washed and dried. PSE-1 has a number-average molecular weight of 42880, and good resistance to acid and base, which does not decompose after being left in concentrated sulphuric acid and concentrated nitric acid for months.

Figure 12:
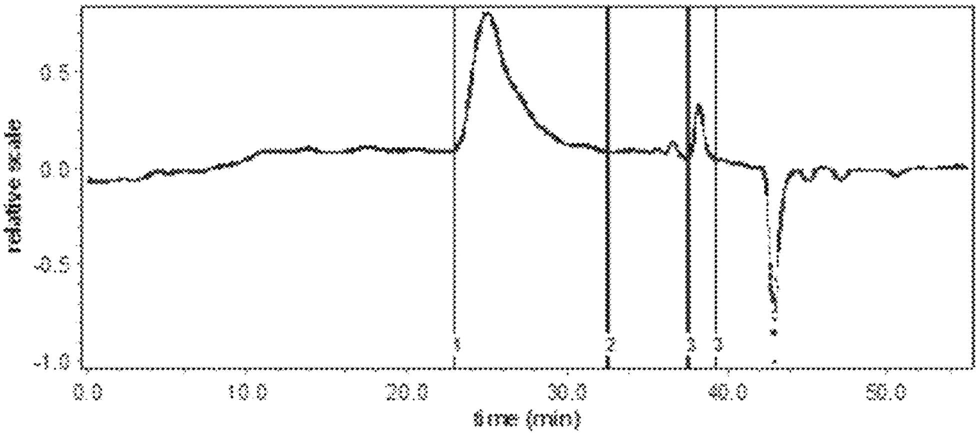
FIG. 12 is the schematic diagram of the Gel chromatography analysis

The performance indicators of the polymerization products are as follows (referring to FIG. 12):

Weight-average molecular weight (Mw)=8.625e+4

Number-average molecular weight (Mn)=4.288e+4

Polydispersity index (PDI [Mw/Mn])=3.01

Polymerization degree: 10~50

Base resistance (10% aqueous NaOH at room temperature): good

Experiments have shown that, in the above polymerization reaction processes, when potassium phosphate, sodium carbonate, sodium carbonate, cesium carbonate, etc. are used, polysulfate ester-1 (PSE-1) containing bisphenol A with similar polymerization degrees and performances can also be obtained.

| reagent | R | | base | Mn 10*4 | Dpi | yield % |
|---|---|---|---|---|---|---|
| 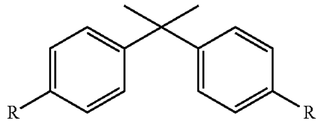 | R = OH a<br>R = $OSO_2F$ b | a + b | $Na_2CO_3$<br>$K_2CO_3$<br>$K_3PO_4$ | 11.4<br>5.3<br>4.8 | 1.50<br>1.44<br>1.50 | 94.5<br>95.2<br>92.4 |
| 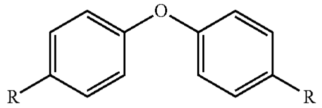 | R = OH c<br>R = $OSO_2F$ d | a + d | $K_2CO_3$ | 4.6 | 2.01 | 97.2 |
| 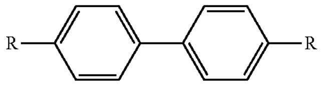 | R = OH e<br>R = $OSO_2F$ f | b + f | $K_2CO_3$ | 6.8 | 1.98 | 95.3 |

Reaction conditions: 1:1 of bisphenol monomer and bisulfuryl fluoride monomer; 1.2 equivalents of base is added; solvent and dehydrating agent are added; the temperature is raised to 90-150° C. to become saline water and continues to be raised between 130-190° C. for polycondensation reaction; if ends need to be capped after the polymerization is complete, then about 1-5% equivalents of end-capping reagent is added, further reacted for 10-20 h, poured into water for precipitation, and the product is obtained by continuing to be washed and dried.

Example 2. Synthesis of polysulfate ester-1 4,4-dihydroxy-diphenyl with polymerization degree of 5~500 (PSE-2) containing (1) Synthesis of Bisphenol A Protected by Sulfonyl Fluoride: The Same as in Example 1.

(2) Synthesis of Bisphenol Type Polysulfate Ester-2 (PSE-2) with Polymerization Degree of 10~500

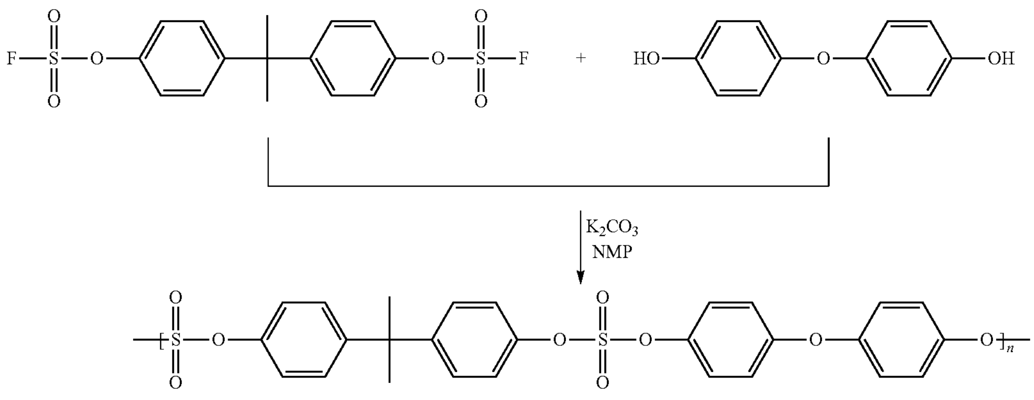

PSE-2

Under the atmosphere of nitrogen, 392 g (10 mol) of the above prepared bisphenol A protected by sulfonyl fluoride and 202 g (10 mol) of 4,4-dihydroxy-diphenyl ether with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid polysulfate ester PSE-2 containing 4,4-dihydroxy-diphenyl: yield: 97%. PSE-2 has a number-average molecular weight Mn of 40.1 kDa, and PDI=1.41.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

Example 3. Synthesis of polysulfate ester-3 containing 4,4-dihydroxy-diphenyl thioether with polymerization degree of 5~500 (PSE-3)

(1) Synthesis of Bisphenol A Protected by Sulfonyl Fluoride: The Same as in Example 1.

(2) Synthesis of Bisphenol Type Polysulfate Ester-3 (PSE-3) with Polymerization Degree of 10~500

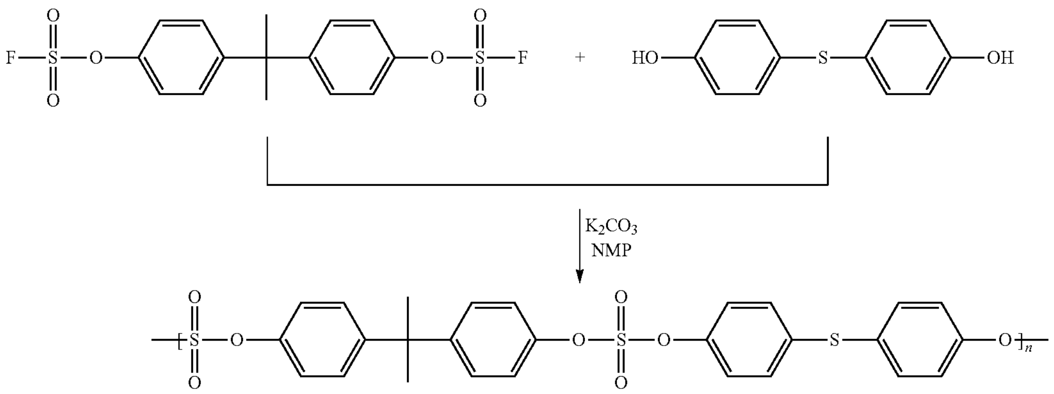

PSE-3

Under the atmosphere of nitrogen, 392 g (10 mol) of the above prepared bisphenol A protected by sulfonyl fluoride and 218 g (10 mol) of 4,4-dihydroxy-diphenyl thioether with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid polysulfate ester PSE-3 containing 4,4-dihydroxy-diphenyl: yield: 98%. PSE-3 has a number-average molecular weight Mn of 90.2 kDa, and PDI=1.65.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

Example 4. Synthesis of polysulfate ester-4 containing 4,4-dihydroxy-diphenyl sulphone with polymerization degree of 10~500 (PSE-4)

(1) Synthesis of Bisphenol A Protected by Sulfonyl Fluoride: The Same as in Example 1.

(2) Synthesis of Bisphenol Type Polysulfate Ester-4 (PSE-4) with Polymerization Degree of 10~500 polysulfate ester PSE-4 containing 4,4-dihydroxy-diphenyl: yield: 97%. PSE-4 has a number-average molecular weight Mn of 41.2 kDa, and PDI=1.45.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

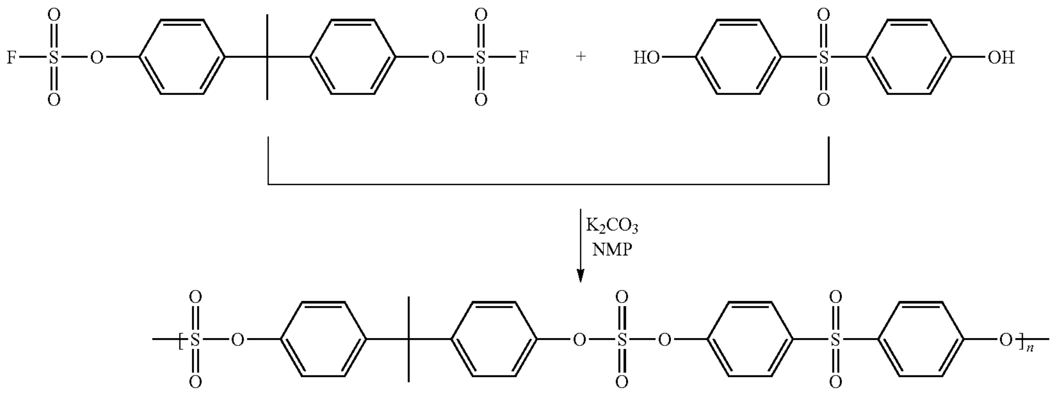

PSE-4

Under the atmosphere of nitrogen, 392 g (10 mol) of the above prepared bisphenol A protected by sulfonyl fluoride and 250 g (10 mol) of 4,4-dihydroxy-diphenyl sulphone with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid Example 5. Synthesis of polysulfate ester-5 containing 4,4-dihydroxy-diphenyl ketone with polymerization degree of 5~500 (PSE-5)

(1) Synthesis of Bisphenol A Protected by Sulfonyl Fluoride: The Same as in Example 1.

(2) Synthesis of Bisphenol Type Polysulfate Ester-5 (PSE-5) with Polymerization Degree of 10~500

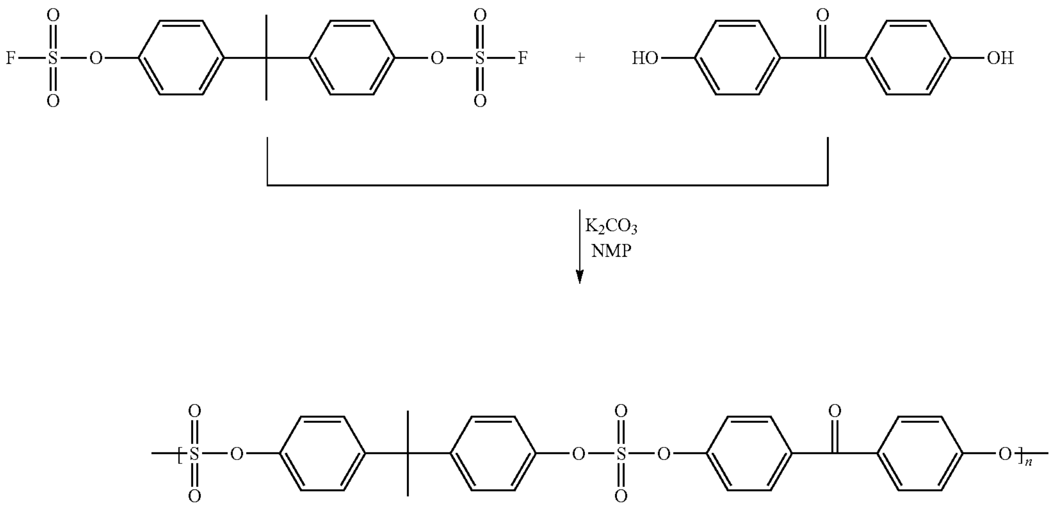

PSE-5

Under the atmosphere of nitrogen, 392 g (10 mol) of the above prepared bisphenol A protected by sulfonyl fluoride and 202 g (10 mol) of 4,4-dihydroxy-diphenyl ketone with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid polysulfate ester PSE-5 containing 4,4-dihydroxy-diphenyl: yield: 98%. PSE-5 has a number-average molecular weight Mn of 69.2 kDa, and PDI=1.52.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

Example 6. Synthesis of polysulfate ester-6 containing 4,4-dihydroxy-diphenyl thioether with polymerization degree of 5~500 (PSE-6)

(1) Synthesis of Bisphenol 4,4-Dihydroxy-Diphenyl Thioether Protected by Sulfonyl Fluoride: The Same as in Example 1.

(2) Synthesis of Bisphenol Type Polysulfate Ester-6 (PSE-6) with Polymerization Degree of 10~500

Under the atmosphere of nitrogen, 382 g (10 mol) of the above prepared bisphenol 4,4-dihydroxy-diphenyl thioether protected by sulfonyl fluoride and 250 g (10 mol) of 4,4-dihydroxy-diphenyl thioether with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid polysulfate ester PSE-6 containing 4,4-dihydroxy-diphenyl thioether: yield: 95%. PSE-6 has a number-average molecular weight Mn of 77.9 kDa, and PDI=1.57.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

Example 7. Synthesis of polysulfate ester-7 containing 4,4-dihydroxy-diphenyl sulphone with polymerization degree of 5~500 (PSE-7)

(1) Synthesis of 4,4-Dihydroxy-Diphenyl Sulphone Protected by Sulfonyl Fluoride: The Same as in Example 1.

(2) Synthesis of Bisphenol Type Polysulfate Ester-7 (PSE-7) with Polymerization Degree of 10~500

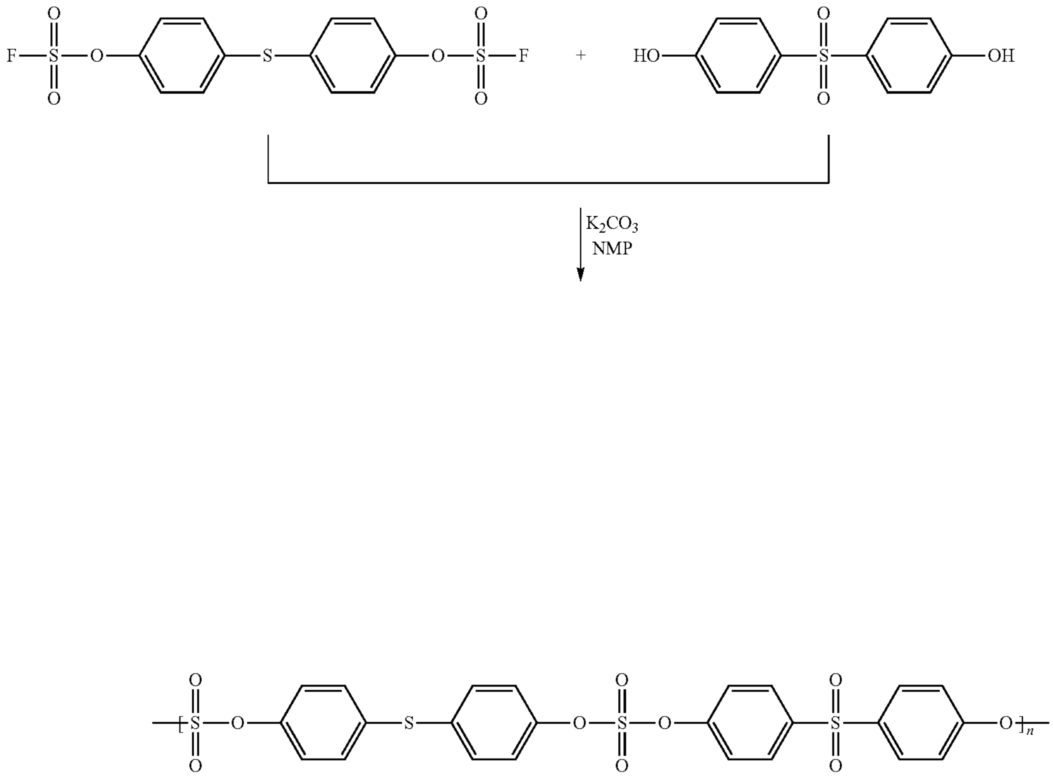

PSE-6

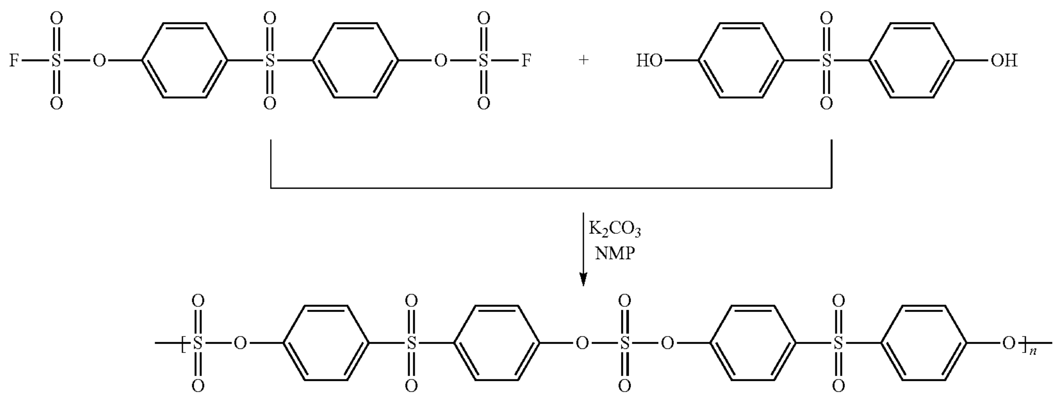

PSE-7

Under the atmosphere of nitrogen, 414 g (10 mol) of the above prepared 4,4-dihydroxy-diphenyl sulphone protected by sulfonyl fluoride and 250 g (10 mol) of 4,4-dihydroxy-diphenyl ether with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid polysulfate ester PSE-7 containing 4,4-dihydroxy-diphenyl: yield: 95%. PSE-7 has a number-average molecular weight Mn of 40.6 kDa, and PDI=1.44.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

Example 8. Synthesis of polysulfate ester-8 containing 4,4-dihydroxy-diphenyl ketone with polymerization degree of 5~500 (PSE-8)

(1) Synthesis of 4,4-Dihydroxy-Diphenyl Ketone Protected by Sulfonyl Fluoride: The Same as in Example 1.

(2) Synthesis of Bisphenol Type Polysulfate Ester-8 (PSE-8) with Polymerization Degree of 10~500

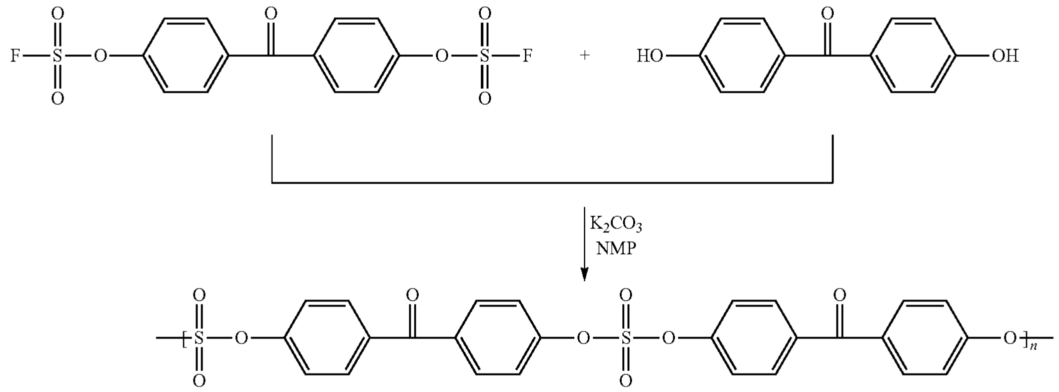

PSE-8

Under the atmosphere of nitrogen, 387 g (10 mol) of the above prepared 4,4-dihydroxy-diphenyl ketone protected by sulfonyl fluoride and 214 g (10 mol) of 4,4-dihydroxy-diphenyl ketone with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid polysulfate ester PSE-8 containing 4,4-dihydroxy-diphenyl: yield: 97%. PSE-8 has a number-average molecular weight Mn of 132.2 kDa, and PDI=2.62.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

Example 9. Synthesis of polysulfate ester-9 containing 4,4-dihydroxy-biphenyl with polymerization degree of 5-500 (PSE-9)

(1) Synthesis of Bisphenol A Protected by Sulfonyl Fluoride: The Same as in Example 1.

(2) Synthesis of Bisphenol Type Polysulfate Ester-9 (PSE-9) with Polymerization Degree of 10~500

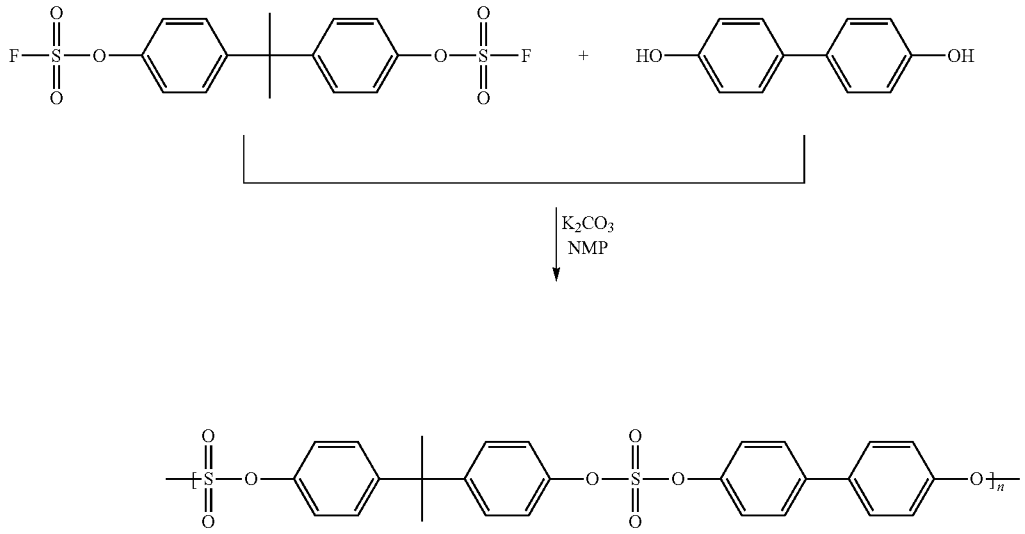

PSE-9

Under the atmosphere of nitrogen, 392 g (10 mol) of the above prepared bisphenol A protected by sulfonyl fluoride and 186 g (10 mol) of 4,4-dihydroxy-biphenyl with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid polysulfate ester PSE-9 containing 4,4-dihydroxy-diphenyl: yield: 95%. PSE-9 has a number-average molecular weight Mn of 79.2 kDa, and PDI=1.60.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

Example 10. Synthesis of polysulfate ester-10 containing 4,4-dihydroxy-biphenyl with polymerization degree of 10-500 (PSE-10)

(1) Synthesis of 4,4-Dihydroxy-Biphenyl Protected by Sulfonyl Fluoride: The Same as in Example 1.

(2) Synthesis of Bisphenol Type Polysulfate Ester-10 (PSE-10) with Polymerization Degree of 10~500

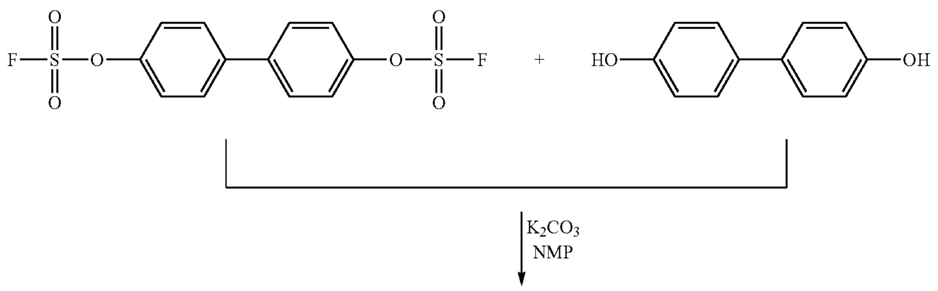

-continued

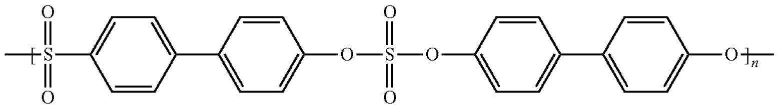

PSE-10

Under the atmosphere of nitrogen, 350 g (10 mol) of the above prepared bisphenol A protected by sulfonyl fluoride and 186 g (10 mol) of 4,4-dihydroxy-diphenyl ether with an equal molar amount, 300 g of NMP solvent, and 50 g of xylene were completely dissolved by heating, then 120% molar amount (1.2 mol) of the catalyst potassium carbonate was added, and the mixture was reacted at 130° C. with mechanical stirring for 2 hour, raised to 170° C. and reacted for 12 h, and poured into water to terminate the reaction. The precipitated polymerization product is separated, extracted by ethanol, and dried to obtain a white solid polysulfate ester PSE-10 containing 4,4-dihydroxy-diphenyl: yield: 95%. PSE-10 has a number-average molecular weight Mn of 126.2 kDa, and PDI=1.72.

As can be seen, as compared to the traditional polyester synthesis method, the present invention is economical, and the by-products are fluoride inorganic salts, which can be sold as industrial products; the reaction conditions are mild and easy to control, the reaction process is simple and easy to operate; the post-treatment process is simple with little environmental pollution, which is beneficial to industrial production. In addition, the bisphenol type polysulfate ester compounds synthesized by the present invention have excellent mechanical performances, dielectric performances, tolerance performances, and abrasion resistance performances.

The invention claimed is:

1. A synthesis method for sulfate ester (amine) type linker polymer, consisting of:

a monomer containing free hydroxyl group or free amino group and a monomer containing sulfuryl fluoride group proceeding a polycondensation reaction under a basic condition by one-pot process, wherein, the monomer containing free hydroxyl group has a structural formula of $HO—X(—OH)_n$, wherein X is an aromatic group containing a heterocycle, an aromatic group containing no heterocycle, aliphatic hydrocarbon, amino acid, or amino acid derivative, and a is an integer of 1 to 3, the monomer containing free amino group has a structural formula of $H_2N—Z(—NH_2)_b$, wherein Z is an aromatic group containing a heterocycle, an aromatic group containing no heterocycle, aliphatic hydrocarbon, amino acid, or amino acid derivative, and b is an integer of 1 to 3, the monomer containing sulfuryl fluoride group has a structural formula of

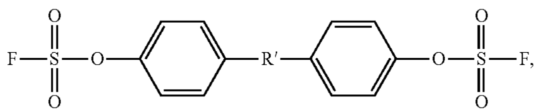

wherein R' is —S—, $—C(CF_3)_2$, —C(O)—, —C(O)NH—, or —C(O)O)—, wherein the basic condition is achieved by adding a base, and the base is an inorganic base, wherein the inorganic base and the monomer containing sulfuryl fluoride group have a molar ratio of 0.5:1-4:1, wherein the polycondensation reaction occurs in a presence or absence of solvent.

2. The synthesis method according to claim 1, wherein the monomer containing free hydroxyl group is a bisphenol monomer having a structural formula of

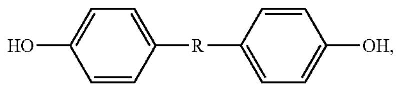

wherein R is —S—, —O—, $—CH_2$, $—C(CH_3)_2$, $—C(CF_3)_2$, —C(O)—, $—S(O)_2—$, —C(O)NH—, or —C(O)O—.

3. The synthesis method according to claim 1, wherein the inorganic base is at least one selected from the group consisting of potassium phosphate, sodium hydroxide, potassium hydroxide, sodium carbonate, potassium carbonate, sodium phosphate, and cesium carbonate.

4. The synthesis method according to claim 1, wherein the solvent is at least one selected from the group consisting of sulfolane, N,N-dimethylformamide (DMF), N,N-dimethylacetamide (DEF), dimethyl sulfoxide (DMSO), N-methylpyrrolidone (NMP), chlorobenzene, xylene, trimethylbenzene, tetrahydrofuran, n-hexane, and cyclopentane, the solvent comprises at least one water-carrying agent, and the water-carrying agent is chlorobenzene, xylene, trimethylbenzene, or n-hexane.

5. The synthesis method according to claim 1, wherein when the polycondensation reaction occurs in the absence of the solvent, and the polycondensation reaction proceeds in a state that the monomer containing free hydroxyl group or free amino group and the monomer containing sulfuryl fluoride group are molten.

6. The synthesis method according to claim 1, wherein the synthesis method proceeds end-capping reaction or end modification reaction after the polycondensation reaction is complete.

7. The synthesis method according to claim 6, wherein an end-capping reagent in the end-capping reaction is at least one selected from the group consisting of chloromethane, phenol, phenol-based derivatives, and chlorobenzophenone monofunctional compound.

* * * * *